United States Patent
Wong et al.

(10) Patent No.: US 7,616,254 B2
(45) Date of Patent: Nov. 10, 2009

(54) SIMPLE METHOD FOR CALCULATING CAMERA DEFOCUS FROM AN IMAGE SCENE

(75) Inventors: Earl Quong Wong, Vallejo, CA (US); Hidenori Kushida, Tokyo (JP); Makibi Nakamura, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 558 days.

(21) Appl. No.: 11/384,135

(22) Filed: Mar. 16, 2006

(65) Prior Publication Data

US 2007/0216765 A1    Sep. 20, 2007

(51) Int. Cl.
H04N 5/232 (2006.01)

(52) U.S. Cl. .................. 348/349; 396/121

(58) Field of Classification Search ............ 348/46, 348/345, 349, 344, 346, 350, 353, 97; 250/201.7
See application file for complete search history.

(56) References Cited

U.S. PATENT DOCUMENTS

| | | | |
|---|---|---|---|
| 4,349,254 A | 9/1982 | Jyojki et al. | |
| 4,751,570 A | 6/1988 | Robinson | |
| 4,947,347 A | 8/1990 | Sato | |
| 4,965,840 A | 10/1990 | Subbarao | |
| 5,148,209 A | 9/1992 | Subbarao | |
| 5,212,516 A * | 5/1993 | Yamada et al. ............. | 348/354 |
| 5,365,597 A | 11/1994 | Holeva | |
| 5,432,331 A * | 7/1995 | Wertheimer ............. | 250/201.7 |
| 5,577,130 A | 11/1996 | Wu | |
| 5,604,537 A | 2/1997 | Yamazaki et al. | |
| 5,703,637 A | 12/1997 | Miyazaki et al. | |
| 5,752,100 A | 5/1998 | Schrock | |
| 5,793,900 A | 8/1998 | Nourbakhsh et al. | |
| 6,023,056 A * | 2/2000 | Fiete et al. ............. | 250/201.7 |
| 6,130,417 A * | 10/2000 | Hashimoto ............. | 250/201.2 |
| 6,177,952 B1 | 1/2001 | Tabata et al. | |
| 6,229,913 B1 | 5/2001 | Nayar et al. | |
| 6,677,948 B1 | 1/2004 | Wasserman et al. | |

(Continued)

FOREIGN PATENT DOCUMENTS

| | | |
|---|---|---|
| JP | 10108152 | 4/1998 |
| JP | 2004048644 | 12/2004 |

OTHER PUBLICATIONS

L. Firestone, K. Cook, K. Culp, N. Talsania, K. Preston Jr., "Comparison of autofocus methods for automated microscopy"-, Mar. 13, 2006, pp. 195-262, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera", May 2003, pp. 257-262, Consumer Electronics, IEEE Transactions.

(Continued)

*Primary Examiner*—David L Ometz
*Assistant Examiner*—Ahmed A Berhan
(74) *Attorney, Agent, or Firm*—Blakely, Sokoloff, Taylor & Zafman LLP

(57) ABSTRACT

An imaging acquisition system that generates a picture depth from an auto focus curve generated from picture of a three dimensional spatial scene is described. The auto focus curve comprises a step edge. The system generates the depth based on the step edge and a reference auto focus normalization curve.

20 Claims, 25 Drawing Sheets

U.S. PATENT DOCUMENTS

| | | | |
|---|---|---|---|
| 6,683,652 | B1 | 1/2004 | Ohkawara et al. |
| 6,829,383 | B1 | 12/2004 | Berestov |
| 6,876,776 | B2 | 4/2005 | Recht |
| 6,891,966 | B2 | 5/2005 | Chen |
| 6,925,210 | B2 | 8/2005 | Herf |
| 7,019,780 | B1 | 3/2006 | Takeuchi et al. |
| 7,035,451 | B2 | 4/2006 | Harman et al. |
| 7,303,131 | B2 | 12/2007 | Carlson et al. |
| 7,340,077 | B2 | 3/2008 | Goturk et al. |
| 2003/0067536 | A1 | 4/2003 | Boulanger et al. |
| 2003/0231792 | A1 | 12/2003 | Zhang et al. |
| 2004/0027450 | A1 | 2/2004 | Yoshino |
| 2004/0036763 | A1 | 2/2004 | Swift et al. |
| 2004/0125228 | A1 | 7/2004 | Dougherty |
| 2004/0131348 | A1 | 7/2004 | Ohba et al. |
| 2005/0104969 | A1 | 5/2005 | Schoelkopf et al. |
| 2005/0265580 | A1 | 12/2005 | Antonucci et al. |
| 2006/0120706 | A1 | 6/2006 | Cho et al. |
| 2006/0221179 | A1 | 10/2006 | Seo et al. |
| 2006/0285832 | A1 | 12/2006 | Huang |
| 2007/0040924 | A1 | 2/2007 | Cho et al. |

OTHER PUBLICATIONS

Pettersson, Niklas, "Online Stereo Calibration using FPGAs", http://nice.se/publications/pettersson_thesis_2005.pdf, 2005, pp. 1-6.

Ghita, Ovidiu and Whelan, Paul, "Real-Time 3D Estimation Using Depth from Defocus", www.vsq.dcu.ie/papers/vision_2000.pdf, 2000, Third Quarter, vol. 16, No. 3, pp. 1-6.

Ohba, et al., "Real-Time Micro Environmental Observation With Virtual Reality", 2000, International Conference On Pattern Recognition, vol. 4, pp. 487-490.

Ohba, et al., "Microscopic Vision System With All-In-Focus And Depth Images", Dec. 2003, Machine Vision And Applications, vol. 15, Issue 2, pp. 55-62.

Darrell, et al., "Pyramid Based Depth From Focus", 1988, pp. 504-509.

Blickgesteuerte PC-Steuerung,Forschung&Entwicklung, XP-000725834, Publication Date Aug. 4, 1997, pp. 76-78.

21st Century 3D: 3DVX3 Press Release; 21st Century 3D Introduces Uncompressed 4:4:4 Steroscopic camera System-3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postscript); Reads History; Translate Abstract; Title: Three-dimensional Camera Phone, Authors: Iizuka, Kiego, Publications: Applied Optics IP, vol. 43, pp. 6285-6292, Publication Date: Dec. 2004, Origin: WEB, Bibliographic Code: 2004ApOpt..43.62851.

Real-time view interpolation system for a super multiview 3D display; processing; Smithsonian/NASA ADS Physics Abstract Service; find Similar Abstracts (with default settings below); Table of Contents; Also-Read Articles (Reads History); Translate Abstract; Title: Real-Time view interpolastion system for a super multiview 3D display; processing implementation and evaluation; Authors: Hamaguchi, Tadahiko, Fujii, Toshiaki; Honda, Toshio; Affiliation: AA (Telecommunications Advancement Organization of Japan) AB (Telecommunications Advancement Organization of Japan and Nagoya Univ.) AC (Telecommunications Advancement Organization of Japan and Chiba Univer.); Publication; Proc. SPIE vol. 4660, p. 105-115, Steroscopic Displays and Virtual Reality Systems, IX, Andrew J. Woods; John O. Merritt; Stephen A. Benton; Mark T. Bolas; Eds. (Spie Homepage); Publication Date: May 2002; Origin: SPIE; Abstract Copyright: 2002 SPIE-The Internantion Society for Optical Engineering, Downloading of the abstract is permitted for personal use only; Bibliographic Code: 2002SPIE.4600..105H.

3D displays; Using cellophane to convert a liquid crystal display screen into a three dimensional display (3D laptop computer and 3D Camera phone); Keigo Iizuka; Department of Electrical & Computer Engineering, 35 St. George Stree, University of Toronto, Toronto, Ontario, Canada M5S 1A4.

Eugene Hecht, Optics 3rd Edition, Addison-Wesley, The Propagation of Light, Chapter 4, p. 126.

Klaus Berthold, Paul Horn, "Robot Vision", 1986, pp. 1-509.

Tony Lindeberg, "Scale-Space Theory: A Basic Tool For Analysing Structures At Different Scales", Journal of Applied Statistics, vol. 21, No. 2, pp. 225-270, 1994.

Alex Paul Pentland, "A New Sense for Depth of Field", 1987, pp. 1-15, IEEE.

Shang-Hong Lai, Chang-Wu Fu and Shyang Chang, "A Generalized Depth Estimation Algorithm with a Single Image", 1992, pp. 405-411, IEEE.

John Ens and Peter Lawrence, "An Investigation of Methods for Determining Depth from Focus", 1993, pp. 97-108, IEEE.

Gopal Surya and Murali Subbarao, "Depth from Defocus by Changing Camera Aperture: A Spatial Domain Approach", 1993, pp. 61-67, IEEE.

Mats Gokstorp, "Computing depth from out-of-focus blur using a local frequency representation", 1994, pp. 153-158, IEEE.

Gunther Schneider, Bernard Heit, Johannes Honig, and Jacques Brémont, "Monocular Depth Perception By Evaluation Of The Blur In Defocused Images", 1994, pp. 116-119, IEEE.

Murali Subbarao, Tse-Chung Wei, and Gopal Surya, "Focused Image Recovery from Two Defocused Images Recorded with Different Camera Settings", 1995, pp. 1613-1628, IEEE.

Shree K. Nayar, Masahiro Watanabe and Minori Noguchi, Real-Time Focus Range Sensor, 1996, pp. 1186-1198.

Masahiro Watanabe and Shree K. Nayar, "Minimal Operator Set for Passive Depth from Defocus", 1996, pp. 431-438, IEEE.

Johannes Honig, Bernard Heit and Jacques Bremont, "Visual Depth Perception Based on Optical Blur", 1996, pp. 721-724, IEEE.

A.N. Rajagopalan and S. Chaudhuri, "A Variational Approach to Recovering Depth From Defocused Images", 1997, pp. 1158-1164, IEEE.

D. Ziou, S. Wang and J. Vaillancourt, "Depth from Defocus Using the Hermite Transform", 1998, pp. 958-962, IEEE.

Shinsaku Hiura and Takashi Matsuyama, Depth Measurement by the Multi-Focus Camera, 7 pgs., Department of Science and Technology, Japan.

Christophe Simon and Frederique Bicking, "Estimation of depth on thick edges from sharp and blurred images", 2002, pp. 323-328, IEEE.

Ovidiu Ghita, Paul F. Whelan and John Mallon, "Computational approach for depth from defocus", Apr.-Jun. 2005 pp. 023021-1-023021-8, vol. 14(2), Journal of Electronic Imaging.

Tony Lindeberg, "On the axiomatic foundations of linear scale-space: Combining semi-group structure with causality vs. scale invariance", pp. 1-24, 1994, Computational Vision and Action Perception Laboratory (CVAP), Klumer Academic,Sweden.

B.P. Horn, "Robot Vision", 1986, pp. 18-28, MIT Press, New York,McGraw-Hill.

Yalin Xiong, Steven A. Shafer, "Depth from Focusing and Defocusing", 1993, pp. 68-73, IEEE, Pittsburgh, PA.

Kang-Sun Choi, Jun-Suk Lee and Sung-Jae Ko, "New AutoFocusing Technique Using The Frequency Selective Weighted Median Filter for Video Cameras", Jun. 28, 1999, pp. 820-827, IEEE, Korea University, Korea.

L. Firestone, K. Cook, K. Culp, N. Talsania, K. Preston Jr., "Comparison of autofocus methods for automated microscopy"-Abstract, Mar. 13, 2006, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera"-Abstract, May 2003, Consumer Electronics, IEEE Transactions.

* cited by examiner

SIMPLE METHOD FOR CALCULATING CAMERA DEFOCUS FROM AN IMAGE SCENE

RELATED APPLICATIONS

This patent application is related to the U.S. patent application, entitled A NEW METHOD FOR CREATING A DEPTH MAP FOR AUTO FOCUS USING AN ALL IN FOCUS PICTURE AND 2D SCALE SPACE MATCHING, Ser. No. 11/185,611 and DEPTH INFORMATION FOR AUTO FOCUS USING TWO PICTURES AND TWO-DIMENSIONAL GAUSSIAN SCALE SPACE THEORY, Ser. No. 11/204,942.

FIELD OF THE INVENTION

This invention relates generally to imaging, and more particularly to generating a depth map from a single image.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Sony Electronics, Incorporated, All Rights Reserved.

BACKGROUND OF THE INVENTION

A depth map is a map of the distance from objects contained in a three dimensional spatial scene to a camera lens acquiring an image of the spatial scene. Determining the distance between objects in a three dimensional spatial scene is an important problem in, but not limited to, auto-focusing digital and video cameras, computer/robotic vision and surveillance.

There are typically two types of methods for determining a depth map: active and passive. An active system controls the illumination of target objects, whereas a passive system depends on the ambient illumination. Passive systems typically use either (i) shape analysis, (ii) multiple view (e.g. stereo) analysis or (iii) depth of field/optical analysis. Depth of field analysis cameras rely of the fact that depth information is obtained from focal gradients. At each focal setting of a camera lens, some objects of the spatial scene are in focus and some are not. Changing the focal setting brings some objects into focus while taking other objects out of focus. The change in focus for the objects of the scene at different focal points is a focal gradient. A limited depth of field inherent in most camera systems causes the focal gradient.

In one embodiment, measuring the focal gradient to compute a depth map determines the depth from a point in the scene to the camera lens as follows:

$$d_o = \frac{fD}{D - f - 2krf_{number}} \quad (1)$$

where f is the camera lens focal length, D the distance between the image plane inside the camera and the lens, r is the blur radius of the image on the image plane, k is a scale factor, and $f_{number}$ is the $f_{number}$ of the camera lens. The $f_{number}$ is equal to the camera lens focal length divided by the lens aperture. Except for the blur radius, all the parameters on the right hand side of Equation 1 are known when the image is captured. Thus, the distance from the point in the scene to the camera lens is calculated by estimating the blur radius of the point in the image.

Capturing two images of the same scene using different apertures for each image is a way to calculate the change in blur radius. Changing aperture between the two images causes the focal gradient. The blur radius for a point in the scene is calculated by calculating the Fourier transforms of the matching image portions and assuming the blur radius is zero for one of the captured images.

SUMMARY OF THE INVENTION

An imaging acquisition system that generates a picture depth from an auto focus curve of a three dimensional spatial scene. The auto focus curve includes a step edge. The system generates the depth based on the step edge and a reference auto focus normalization curve.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
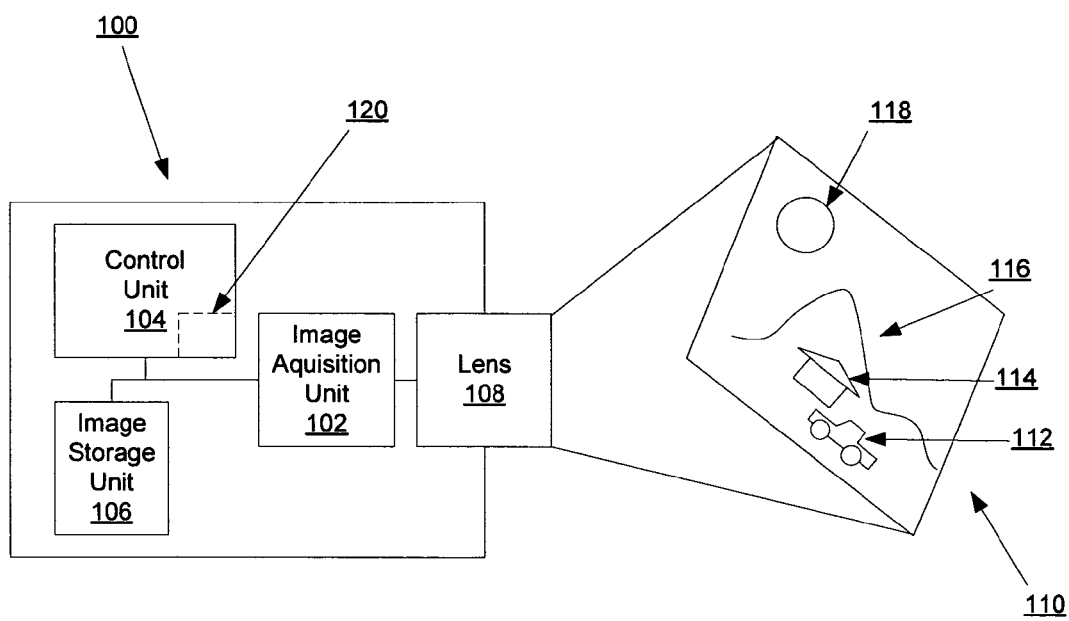
FIG. 1 illustrates one embodiment of an imaging system.

FIG. 1 illustrates one embodiment of an imaging system 100 that captures an image of a three dimensional spatial scene 110. References to an image or a picture are to an image of a three dimensional scene captured by imaging system 100. Imaging system 100 comprises an image acquisition unit 102, a control unit 104, an image storage unit 106, and lens 108. Imaging system 100 may be, but is not limited to, digital or film still camera, video camera, surveillance camera, robotic vision sensor, image sensor, etc. Image acquisition unit 102 captures an image of scene 110 through lens 108. Image acquisition unit 102 may acquire a still picture, such as in a digital or film still camera, or acquire a continuous picture, such as a video or surveillance camera. Control unit 104 typically manages the image acquisition unit 102 automatically and/or by operator input. Control unit 104 configures operating parameters of the image acquisition unit 102 and lens 108 such as, but not limited to, the lens focal length, f, the aperture of the lens, A, lens focus, and (in still cameras) the lens shutter speed. In addition, control unit 104 may incorporate a depth map unit 120 (shown in phantom) that generates a depth map of the scene based on the focusing information acquired by image acquisition unit 102. The image(s) acquired by image acquisition unit 102 are stored in the image storage 106.

In FIG. 1, imaging system 100 records an image of scene 110. While in one embodiment scene 110 is composed of four objects: a car 112, a house 114, a mountain backdrop 116 and a sun 118; other embodiments of scene 110 may be composed of several hundred objects with very subtle features. As is typical in most three dimensional scenes recorded by the lens of the imaging system 100, objects 112-118 in scene 110 are at different distances to lens 108. For example, in scene 110, car 112 is closest to lens 108, followed by house 114, mountain backdrop 116 and sun 118. Because of the limited depth of field inherent in imaging acquisition unit 102, a focal setting of lens 108 will typically have some objects of scene 110 in focus while others will be out of focus. Although references to objects in an image, portions of an image or image block do not necessarily reflect the same specific subdivision of an image, these concepts all refer to a type of image subdivision.

Figure 2:
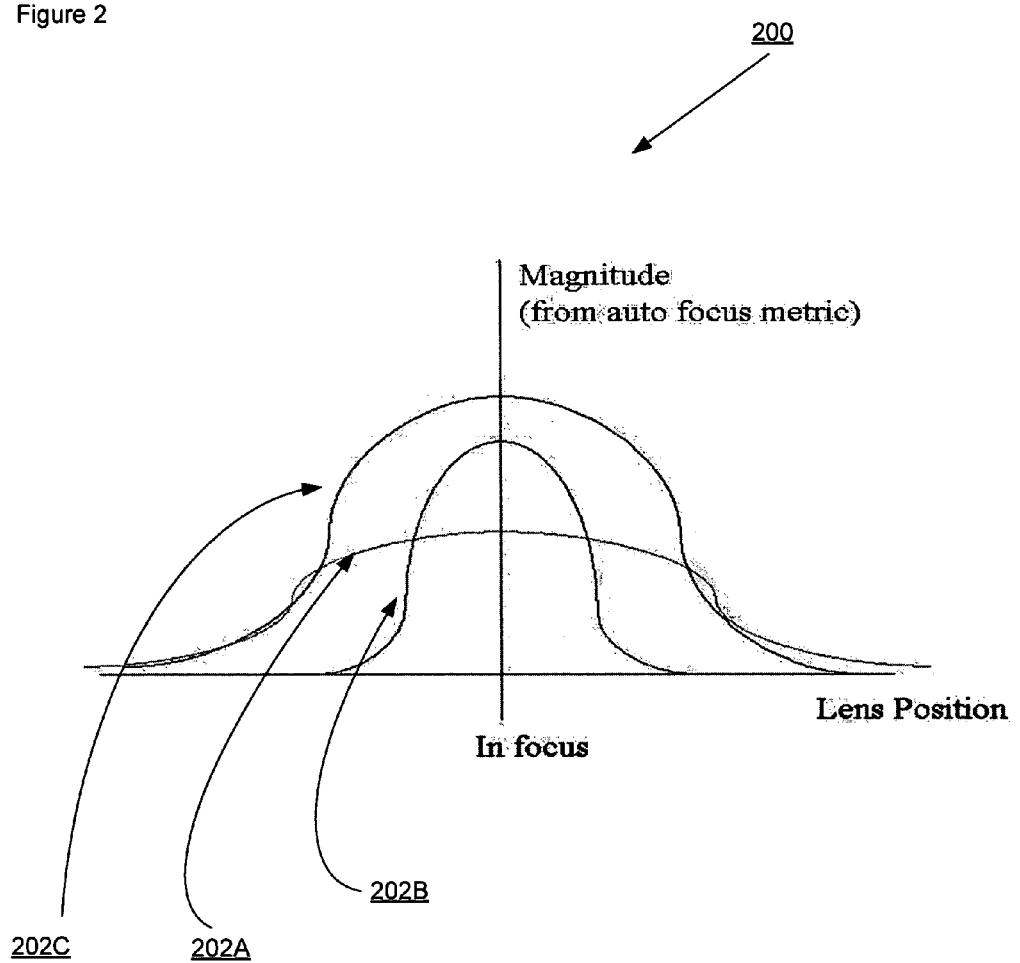
FIG. 2 illustrates one embodiment of a set of image auto focus curves.

Typically, a focusing mechanism in imaging system 100 focus on one object or groups of objects that comprise scene 110. Focusing mechanisms may be either automatic ("auto focus") or manually operated. An automatic focusing mechanism attempts to bring into focus some or all of the objects comprising scene 110. There are many known auto focusing scheme known in the art, such as, active, passive, etc. On the other hand, a manually operated focusing mechanism relies on the operator to focus lens 108. FIG. 2 illustrates one embodiment of a graph 200 comprising a set of image auto focus curves 202A-C for different scenes or regions of a scene. In FIG. 2, graph 200 plots curves 202A-C as a function of image gradient magnitude from an auto focus metric versus lens position. For example and by way of illustration, curve 202A is the auto focus curve for lens 108 focusing on car 112, curve 202B is the auto focus curve of lens 108 focusing on house 114, and curve 202C is the auto focus curve for lens 108 focusing on mountain backdrop 118. The peak of each curve 202A-C determines the in-focus position for the respective region under analysis. Each auto focus curve is computed from image gradient magnitudes. Non-zero image gradient magnitudes can result from image structures such as step edges, roof edges, textured edges, shadows, etc.

A traditional auto focus scheme searches for the peak of the auto focus curve. (e.g., peak-hold-integrate method, hill-climbing, etc.). Or, from another perspective, the auto focus information contained in the curve is a qualitative measure of image defocus, or blurring, and an auto focus scheme attempts to minimize the image blurring. Because an auto focus scheme measures qualitative blurring and blurring is related to depth, the auto focus curve contains depth information. For example, consider the case where the scene consists of a single object on a constant background. If the entire auto focus curve is known, the depth of the object is also known. This is because the peak of the curve corresponds to the in focus position. Once the in-focus position is known and the camera parameters associated with the in focus position are recorded, the depth of the object can be determined. If auto focus curves are created for two distinct objects at two different depths, the two curves will have peak values at two different locations. By knowing the depth of one of the objects, one can then determine the relative depth of the second versus the first object. Often, traditional auto focus schemes are directed towards a relatively large region of an image. Typically, an auto focus scheme will attempt to focus on a region of the image. While in one embodiment, the entire image could be used to generate an auto focus curve, in alternative embodiments, different regions of the image could be used to generate one or more auto focus curves. If multiple objects are located at different depths in a specific region of analysis, the depth of both objects cannot be determined if the auto focus curve contains a single peak. This is attributed to the scale of analysis. In this case, the analyzed region is too large.

Furthermore, if a specific region contains objects at different depths and these objects contain step edges, depth information resulting from the weaker step edges may be lost. For example and by way of illustration, consider an auto focus curve generated from a region containing step edges with contrasts of five, seven and 155. These edges correspond to objects at different depth locations in the region. The resulting auto focus curve will be primarily dominated from the 155 contrasted value step edge information. Many other scenarios are possible based on the contrast of the objects in the region under analysis. In some cases, auto focus curves with multiple maxima/peaks may result due to several different objects at different depths present in the region of analysis. However, without a finer scale, it is impossible to determine the spatial location of these objects in the scene.

Figure 3:
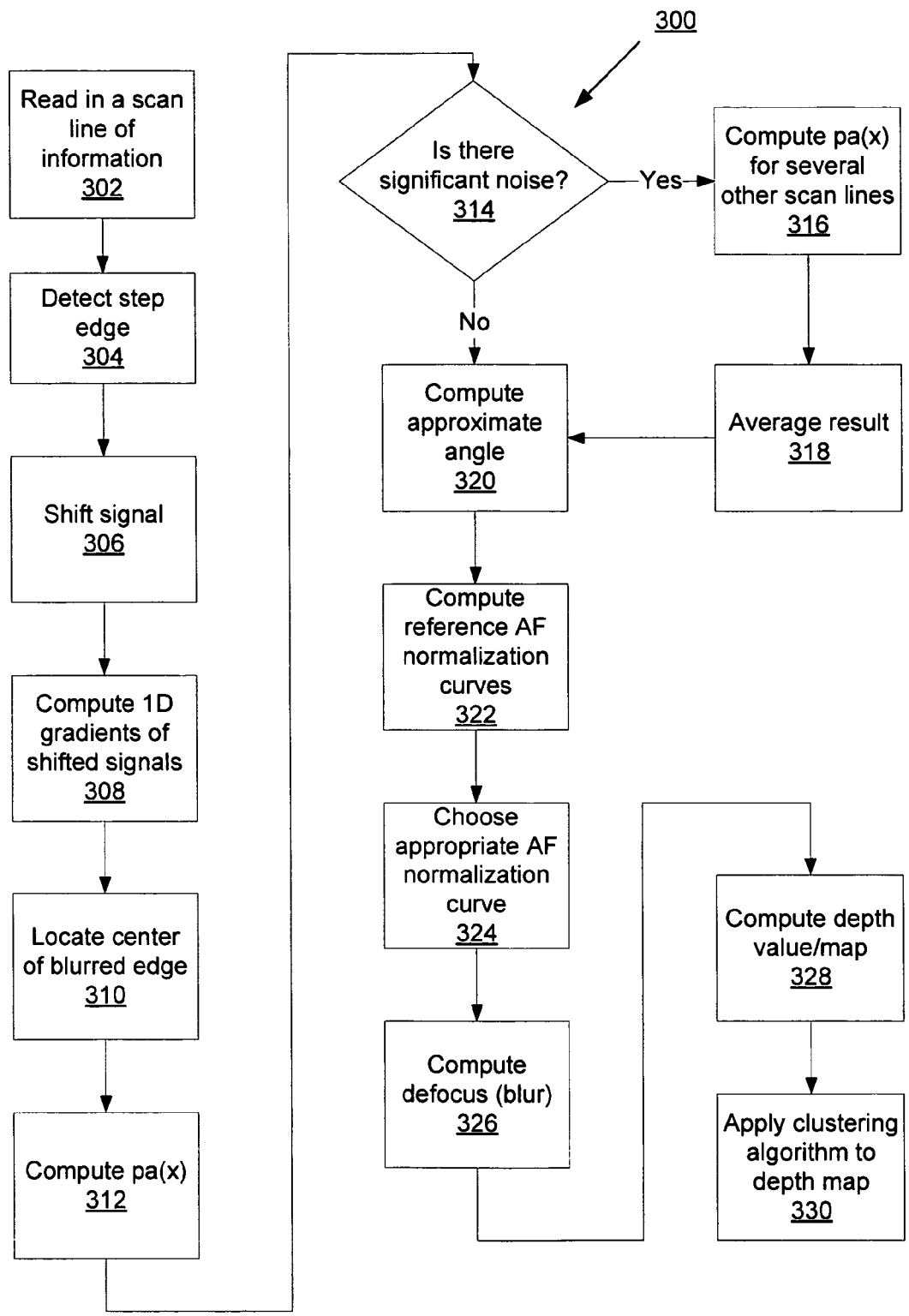
FIG. 3 is a flow chart of one embodiment of a method that computes a depth map from an auto focus normalization curve.

FIG. 3 is a flow chart of one embodiment of a method 300 that computes a depth value from a step edge associated with an auto focus normalization curve. In FIG. 3 at block 302, method 300 reads in a scan line of information. While in one embodiment, the scan line of information is a horizontal scan line, in an alternate embodiment, the scan line is another line orientation (vertical, diagonal, etc.).

At block 304, method 300 locates step edges in the scan line. If there are no step edges in the scan line, no depth information can be recovered.

Figure 4:
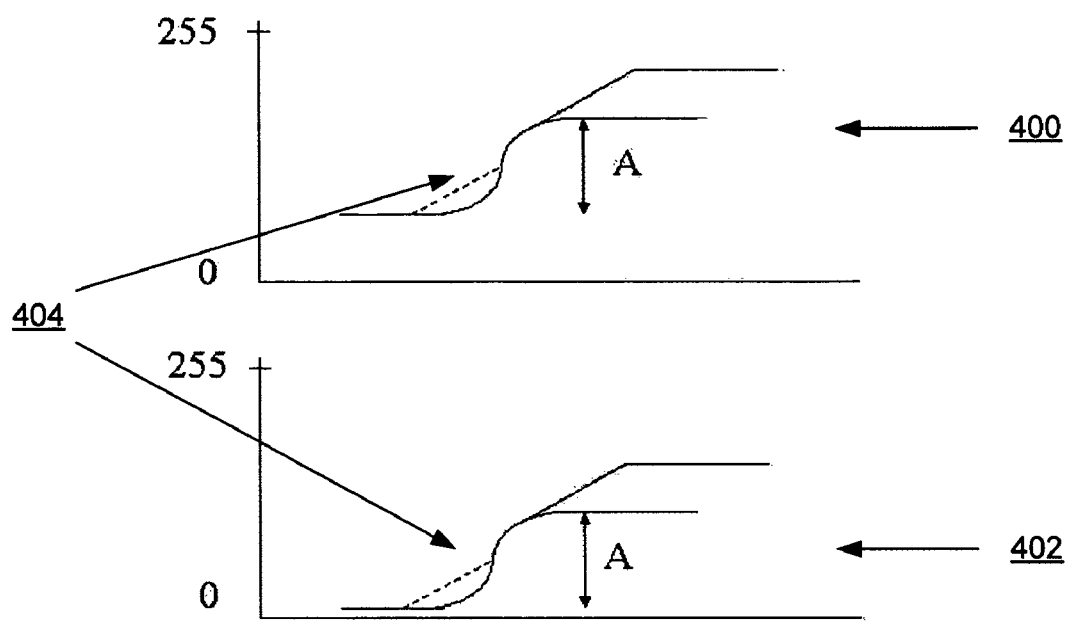
FIG. 4 illustrates one embodiment of a shifted and blurred step edge.

At block 306, method 300 shifts the step edges so that the minimum value of the step edge is zero. FIG. 4 illustrates one embodiment of a shifted, blurred step edge. In FIG. 4, method 300 transforms curve 400 into curve 402 by shifting curve 400 such that the minimum value of curve 400 is zero.

Figure 7:
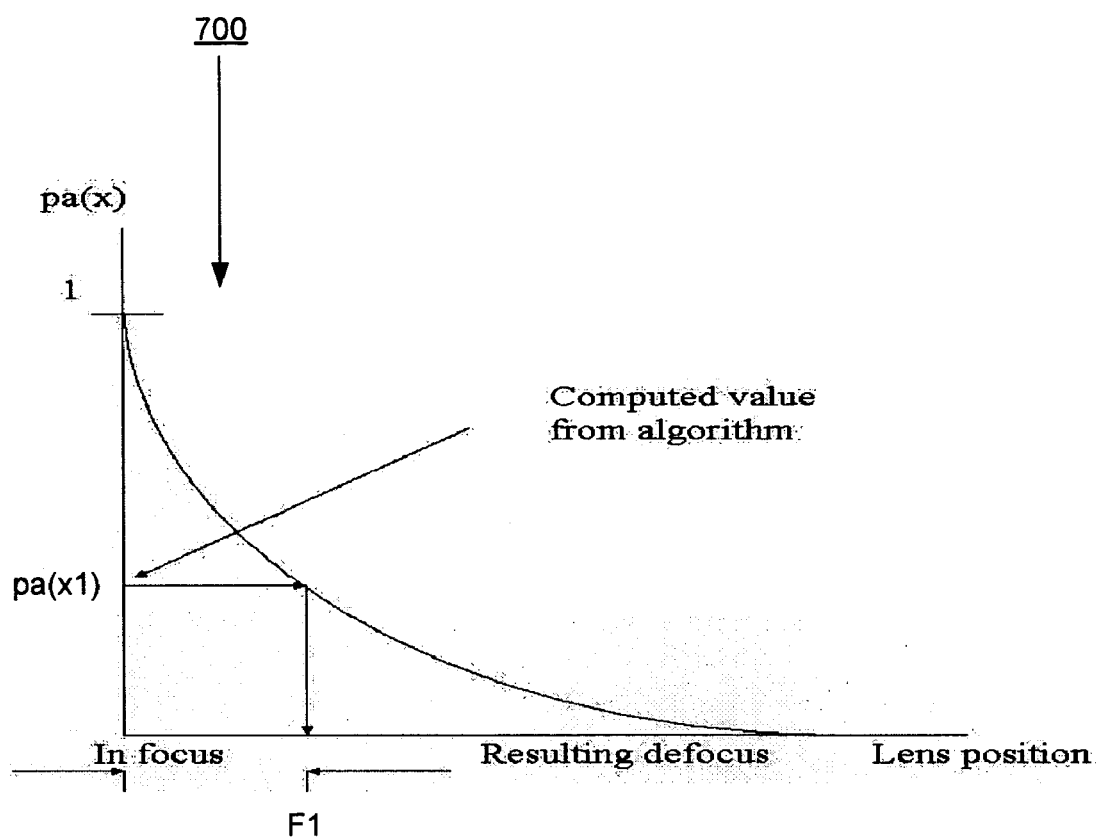
FIG. 7 illustrates one embodiment of an auto focus normalization curve.

Method 300 uses the information derived from the shifted step edge to determine a position on the vertical axis corresponding to the auto focus normalization curve in FIG. 7. The auto focus normalization curve takes on values between zero and one.

Figure 5:
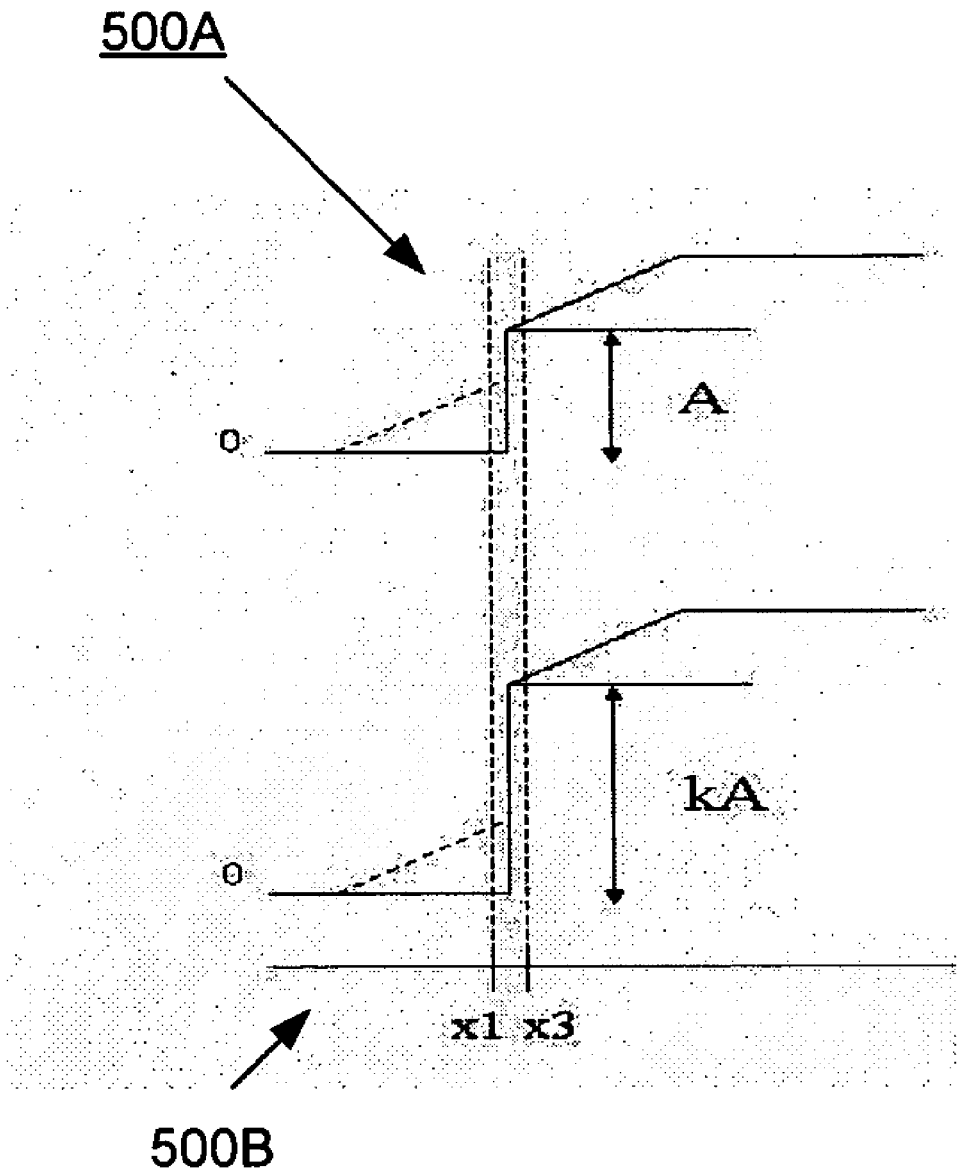
FIG. 5 illustrates one embodiment of a scaled step edge, with two neighboring locations used to compute a finite difference value.

FIG. 5 illustrates one embodiment of a scaled step edge. In FIG. 5, two step edges are illustrated. Step edge 500A has a step of A, whereas step edge 500B has a step of kA. The differences arise because step edges 500A-B represents edges of different contrast in the scene. For example, step edge 500A is a less strongly contrasted step edge with a smaller edge height, whereas step edge 500B is a more strongly contrasted step edge with edge height kA.

Figure 6A:
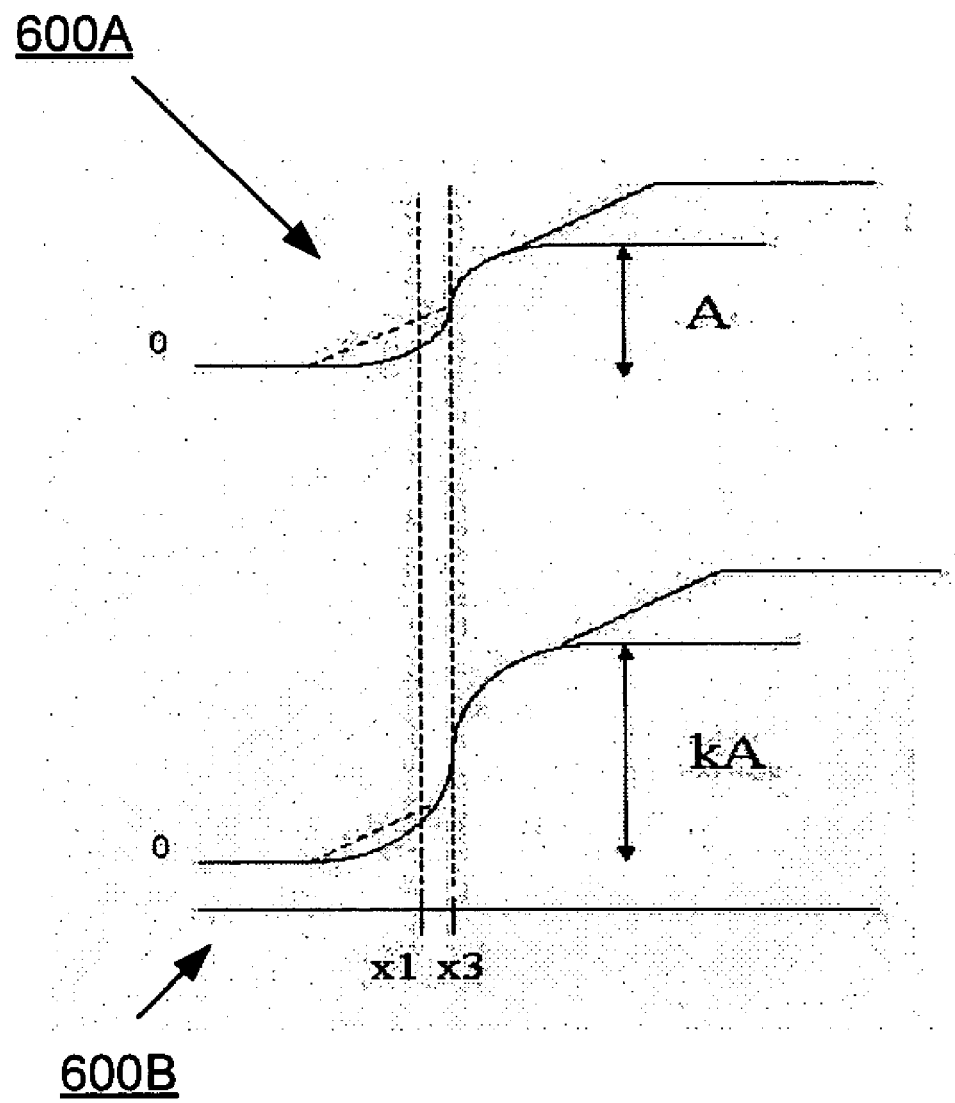
FIG. 6A illustrates one embodiment of a scaled and blurred step edge, with two neighboring locations used to compute a finite difference value.

FIG. 6A illustrates one embodiment of a scaled and blurred step edge. As in FIG. 5, scaling occurs naturally in a scene because of different contrasts in the scene. In FIG. 6, two blurred step edges are illustrated. Blurred step edge 600A has a contrast of A whereas blurred step edge 600B has a contrast of kA. Blurred step edge 600A is a less strongly contrasted blurred step edge while blurred step edge 500B is a more strongly contrasted blurred step edge. Returning to FIG. 3, at block 308, method 300 computes the one-dimensional gradients of the shifted signal and stores the maximum gradient value associated with the shifted signal. For example and by way of illustration, the one-dimensional gradient is computed using the following two element filter: [−1 1]. Alternatively, other one-dimensional gradient filters known in the art can be used to compute the one-dimensional gradient.

At block 310, method 300 locates the center of the shifted step edge. Several methods are known in the art that may be employed: computing the zero crossing associated with the second derivative of the shifted step edge; sliding a (1×n) window over the shifted step edge and finding the location that corresponds to the maximum variance, using the location corresponding to the 1D gradient maxima at block 308, etc.

Once the center of the shifted step edge is determined, the pixel intensity value of the shifted step edge at the immediate neighboring location is determined. If the shifted step edge corresponds to a rising edge and the computed location is x1, method 300 stores the pixel intensity value location x1+1, the pixel immediately adjacent to x1 on the right. Alternatively, if the shifted step edge is a falling edge and the computed location is x1, method 300 stores the pixel intensity value at location x1−1, the pixel immediately adjacent to x1 on the left. In either case, the value is obtained from the shifted step edge. The rationale for the two embodiments described above is that method 300 chooses the embodiment that result in a pa(x) value for the auto focus normalization curve that is non-zero Pa(x) represents a defocus measurement tool for step edges at various angle orientations.

At block 312, method 300 computes pa(x) for the step edge by dividing the gradient value computed at block 308 by the value stored at block 310. As it will be shown later, method 300 computes pa(x) reference curves for different step edge angles. Each reference curve relates a pa(x) value to an amount of defocus. For example and by way of illustration, an auto focus curve of an in-focus picture has a pa(x) of one. As the step edge becomes blurrier, the pa(x) computed values monotonically decreases to zero. Thus, method 300 may use the computed pa(x) value to determine the amount of defocus (or blur) for the picture step edge.

At block 314, method 300 determines if there is significant noise in the image. If so, method 300 computes several additional pa(x) values by repeating blocks 302-312 for several neighboring scan lines at block 316. Method 300 computes an average pa(x) from the original and additional pa(x) values computed at block 318.

Figure 6B:
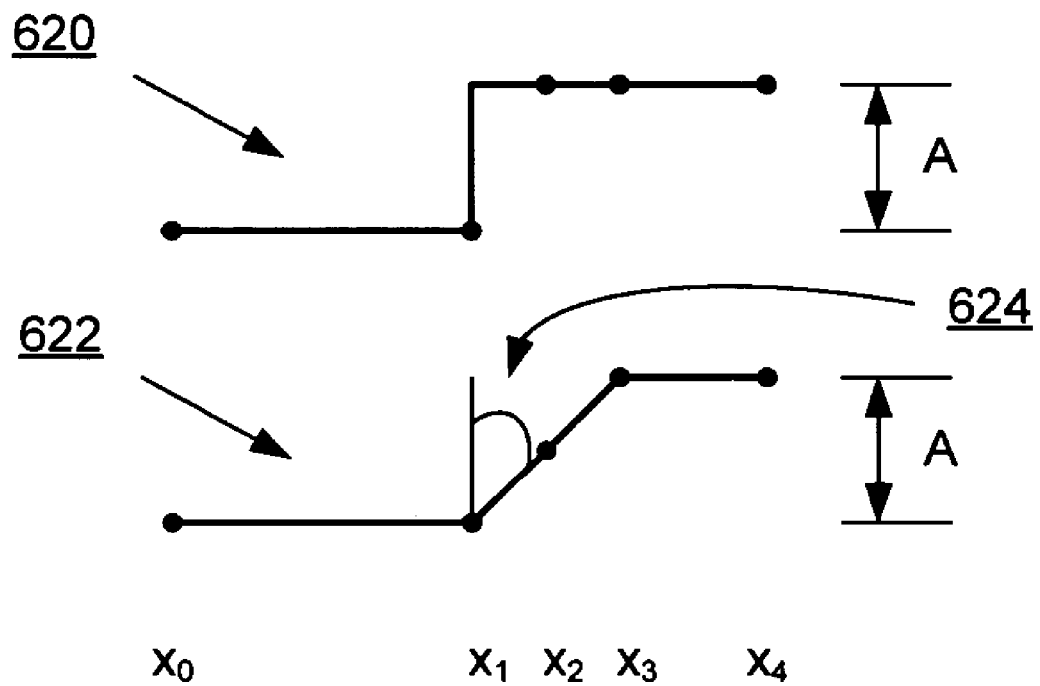
FIG. 6B illustrates embodiments of step functions with differing step edge angles.

At block 320, method 300 computes an approximate angle of the blurred step edge using one the known in the art for computing step edge angles. For a continuous step edge, a step edge is a Heaviside step function. Similarly, a blurred step edge is a Heaviside step function convolved with a blur kernel, as illustrated in FIG. 6A with blurred step edges 600A-B. A step edge or blurred step edge at an angle is a rotated version of the step edge or blurred step edge, respectively. FIG. 6B illustrates one embodiment of a step function 620 with a zero degree step edge angle and a step edge 622 with a forty-five degree angle. Illustrating step edge 620 as a matrix with contrast of one is:

$$000111\ 000111\ 000111\ 000111 \quad (2)$$

In FIG. 6B, step function 620 illustrates a jump in value from $x_1$ and $x_2$. For example and by way of illustration, assuming the value of the step function 620 is zero at $x_1$, the step function 620 value is 1 at $x_2$. Similarly, a matrix representation of step edge 622 with contrast of one is:

$$111111\ 011111\ 001111\ 000011\ 000001 \quad (3)$$

In practice, a step edge transition may not be abrupt since method 300 is sampling a continuous signal and the step edge may not lie in-between the sensor locations. For example, if the light and dark portions of the step edge lie to the right and left hand sides of the two pixel locations, the step edge is:

$$0\ 0\ 0\ 0\ 1\ 1\ 1 \quad (4)$$

However, if the step edge lies somewhere in-between a single pixel location, then the step edge representation could be:

$$0\ 0\ 0\ 0.7\ 1\ 1\ 1 \quad (5)$$

The same is true for step edges at different angle orientations. Auto focus normalization curves are generated for various edge orientations ranging from 0 to 45 degrees. For orientations outside this range, such as 45 to 90 degrees, a vertical scan line is used. The computed pa(x) value is mapped to the appropriate curve in the 0 to 45 degree range. For example, if the edge is oriented at 90 degrees, the auto focus normalization curve corresponds to 0 degrees is used.

At block 322, method 300 computes one or more reference auto focus normalization curves. As mentioned above, the reference auto focus curve correlates a step edge pa(x) value to a known amount of blurring. Because the curve differs for different step edge angles, method 300 generates several different curves. While in one embodiment, method 300 calculates curves for angles zero, eleven, twenty-two, thirty-three, and forty-five degrees, alternates embodiments may calculate curves for more, less, and/or different angles.

FIG. 7 illustrates one embodiment of an auto focus normalization curve. In FIG. 7, pa(x) is the y-axis of curve 700, while lens position is the x-axis. When the step edge is sharp and in focus, a maximum pa(x)=1 value is obtained. At this lens position, there is no de-focus. As the lens is moved away from this position, the step edge becomes blurred, and hence, defocus occurs. As the lens is moved even further away, even more defocus results. As the lens position moves from in focus on the left to positions resulting in more defocus, the pa(x) value drops monotonically from one towards zero. Curve 700 is a representative normalization curve and not intended to show a curve for a particular step edge angle. Nevertheless, method 300 uses the curve 700, or a curve similar to curve 700, to determine the amount of blur associated with a given pa(x) value. For example and by way of illustration, for curve 700, pa(x1) corresponds to a defocus of F1. However, curve 700 is dependent on the step edge angle and is different for differing step angles.

Figure 8A:
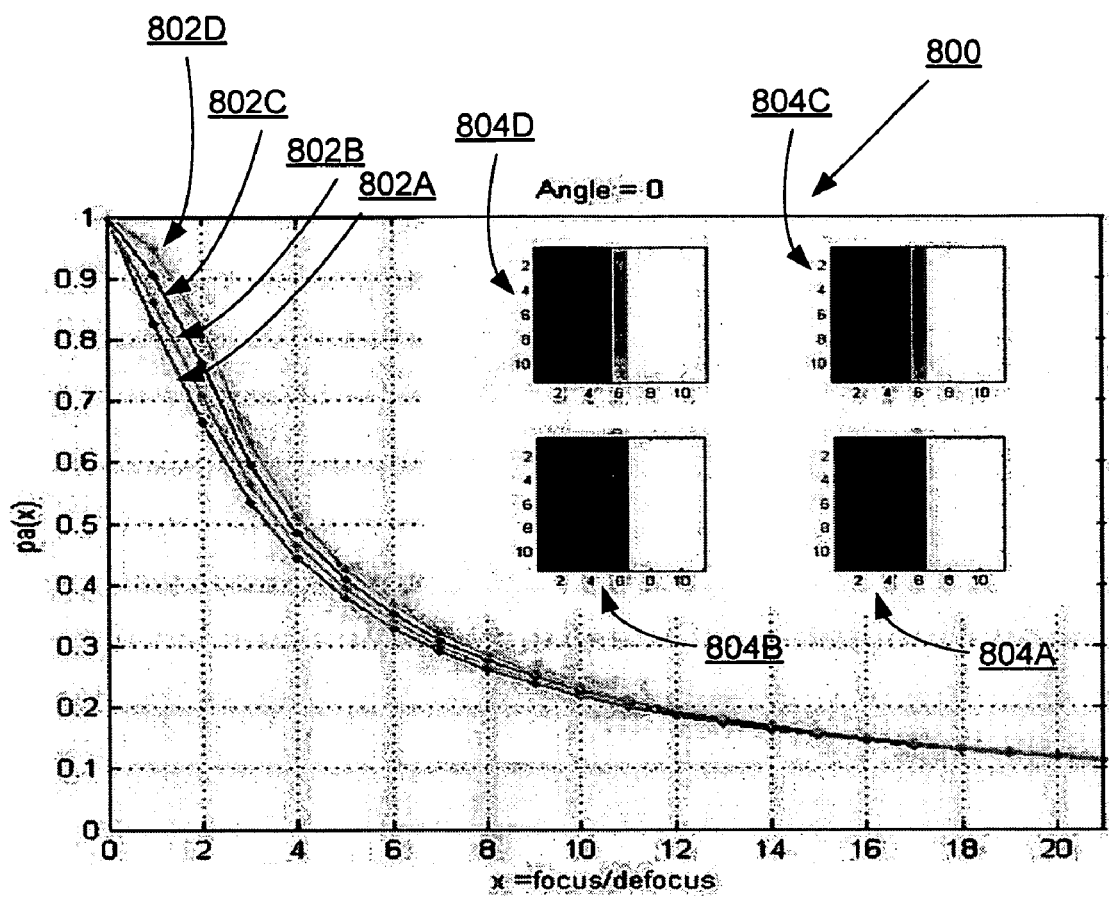
FIGS. 8A-C illustrate one embodiment of auto focus normalization curves computed for edges at zero, thirty-three, and forty-five degree orientations.
Figure 8B:
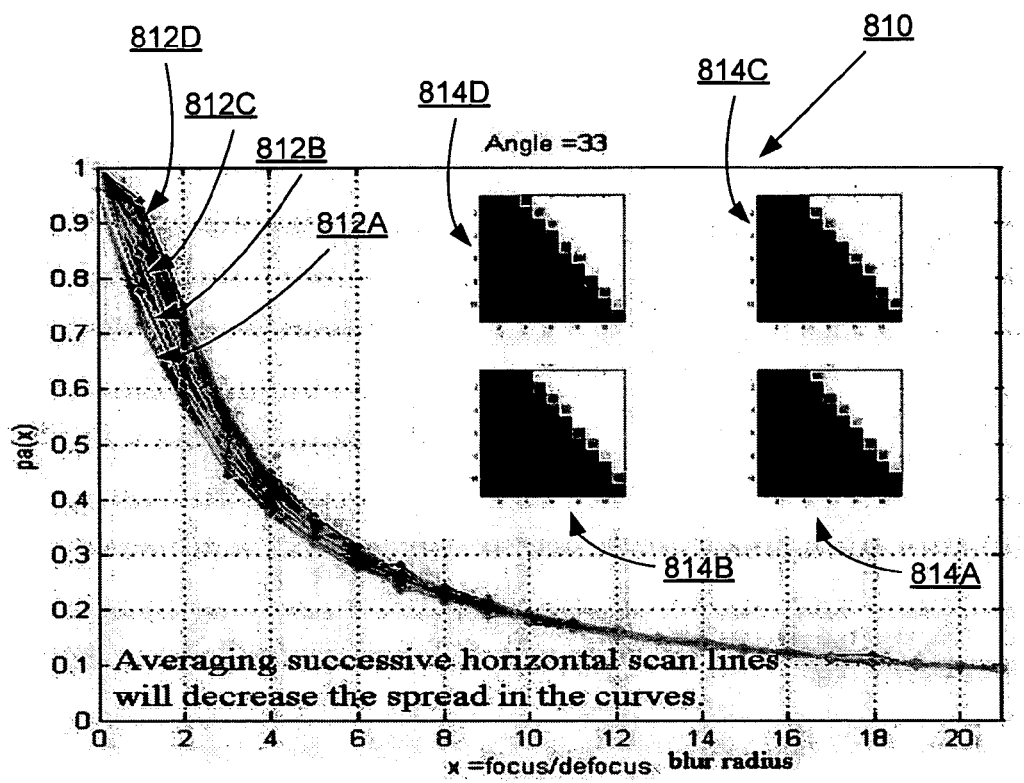
Figure 8C:
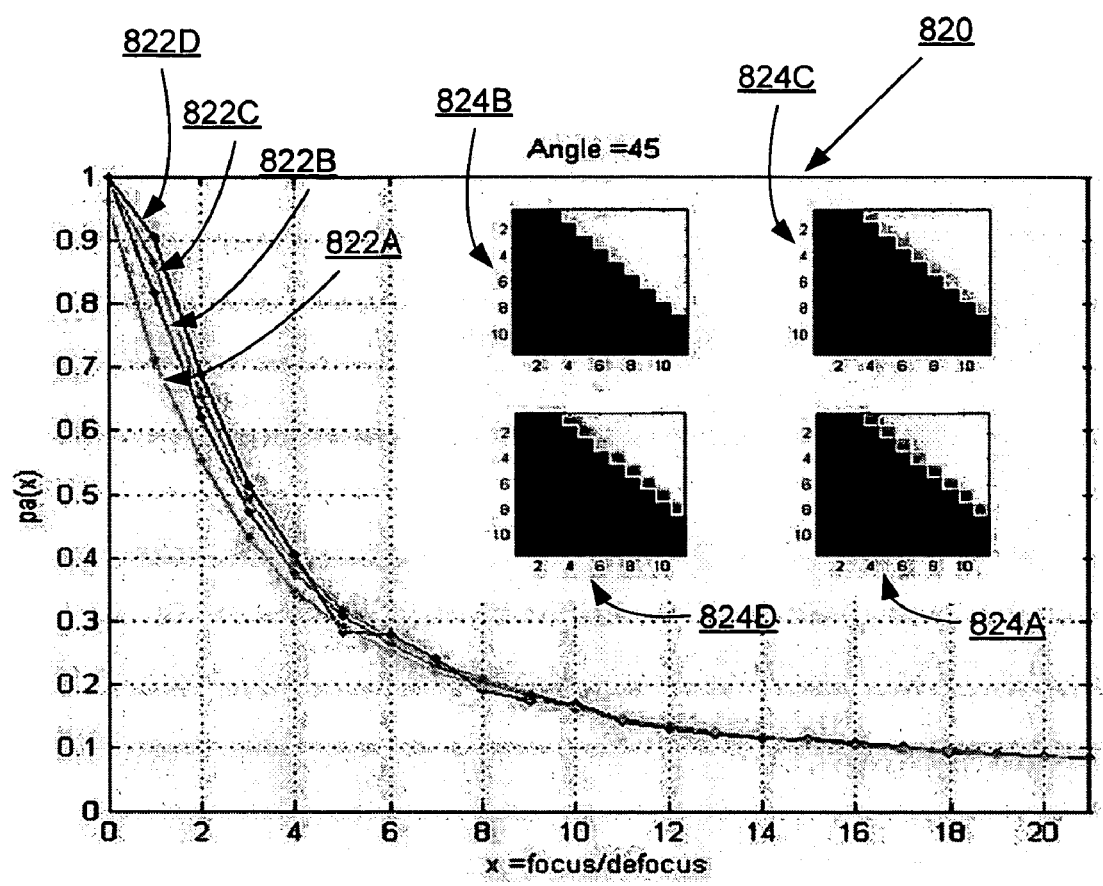

FIGS. 8A-C illustrate one embodiment of an auto focus normalization curve computed for angles of zero, thirty-three, and forty-five. In FIG. 8A, curves 802A-D are auto focus normalization curves for a step edge at zero degrees. As in FIG. 7, curves 802A-D relates a pa(x) value to an amount of defocus. However, unlike in FIG. 7, the step edge represented in curves 802A-D represents step edges for different edge offsets. Previously, equation 5 provided a 1D matrix representation for an edge with a specific offset of 0 0 0 0.7 1 1 1. Curves 802A-D represent offsets ranging in values between 0 and 1. Said another way, the step edges represented by steps 804A-D are shifted with respect to the sensor location.

FIGS. 8B and 8C illustrate a similar offset concept, but the edges are oriented at thirty-three and forty-five degrees. In FIG. 8A, only four edge offsets are shown. As a result, four different auto focus normalization curves result. In FIG. 8B, four edge offsets are shown. However, depending on the scan line chosen for each edge offset, different auto focus normalization curves may result. Hence, this is the reason why there are more than four auto focus normalization curves shown for the thirty-three degree edge orientation. In practice, for each edge orientation, method 300 generates a set of curves for various edge offsets. For example, in FIG. 8A, method 300 generates four curves corresponding to four edge offsets. The resulting offset pixel intensities were 0.2, 0.4, 0.6 and 0.8. The computed and stored auto focus normalization curve can then be generated from the four curves resulting from the four edge offsets. For example, the computed and stored auto focus normalization curve can be generated by averaging the four curves, thereby generating mean auto focus normalization curve. This stored curve is the one that we use in the real world scenario. Method 300 repeats this procedure for the other angle orientations, generating the computed auto focus normalization curve for various specific orientations.

Returning to FIG. 3, at block 324, method 300 chooses the appropriate auto focus normalization curve for the step edge being analyzed. Typically, method 300 chooses the curve with the step edge angle nearest the step edge angle computed at block 320. Alternatively, method 300 chooses the curve with the step edge nearest and at least (or at most) the step angle computed at block 320.

At block 326, method 300 computes the defocus (or blur) of the step edge using the chosen auto focus normalization curve. Using the step edge pa(x) value, method 300 computes the defocus with the chosen normalization curve.

At block 328, method 300 generates a picture depth value from the computed blur using the geometric optics model. As explained above, the geometric optics model relates the distance of an object in a picture to a blurring of that object. Method 300 calculates a distance using Equation 1 from the associated defocus value. Because the lens focal length, f, distance between the camera lens 202 and image plane 206, D, and $f_{number}$ are constant at the time of acquiring the finite depth of field picture, method 300 computes the picture depth from the computed blur. In addition, because scene 110 typically contains several step edges, method 300 may compute a picture depth map by computing a picture depth value for each step edge.

At block 330, method 300 applies a clustering algorithm to the depth map. The clustering algorithm is used to extract regions containing similar depths and to isolate regions corresponding to outliers and singularities. Clustering algorithms are well-known in the art. For example, in one embodiment, method 300 applies nearest neighbor clustering to the picture depth map.

Figure 9:
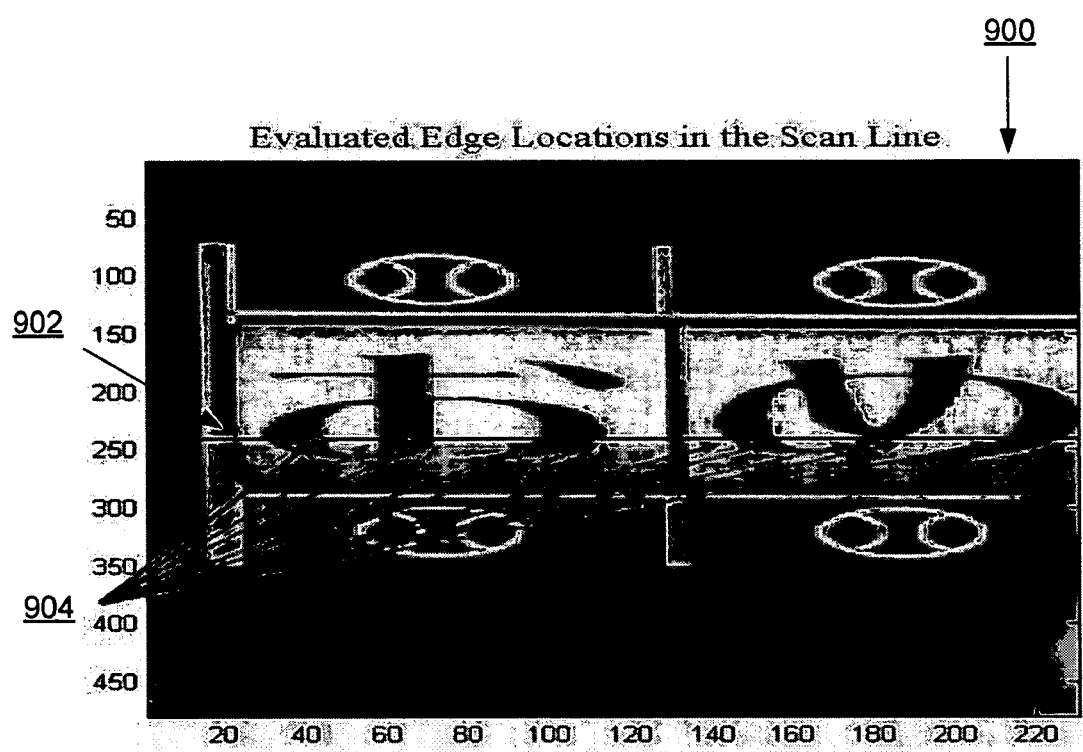
FIG. 9 illustrates a sample test image that contains step edges.

FIG. 9 illustrates one embodiment of a test image 900 that includes step edges. Scan line 902 crosses several of the objects in test image 900. At each crossing point 904, there is typically a step edge in the auto focus metric.

Figure 10:
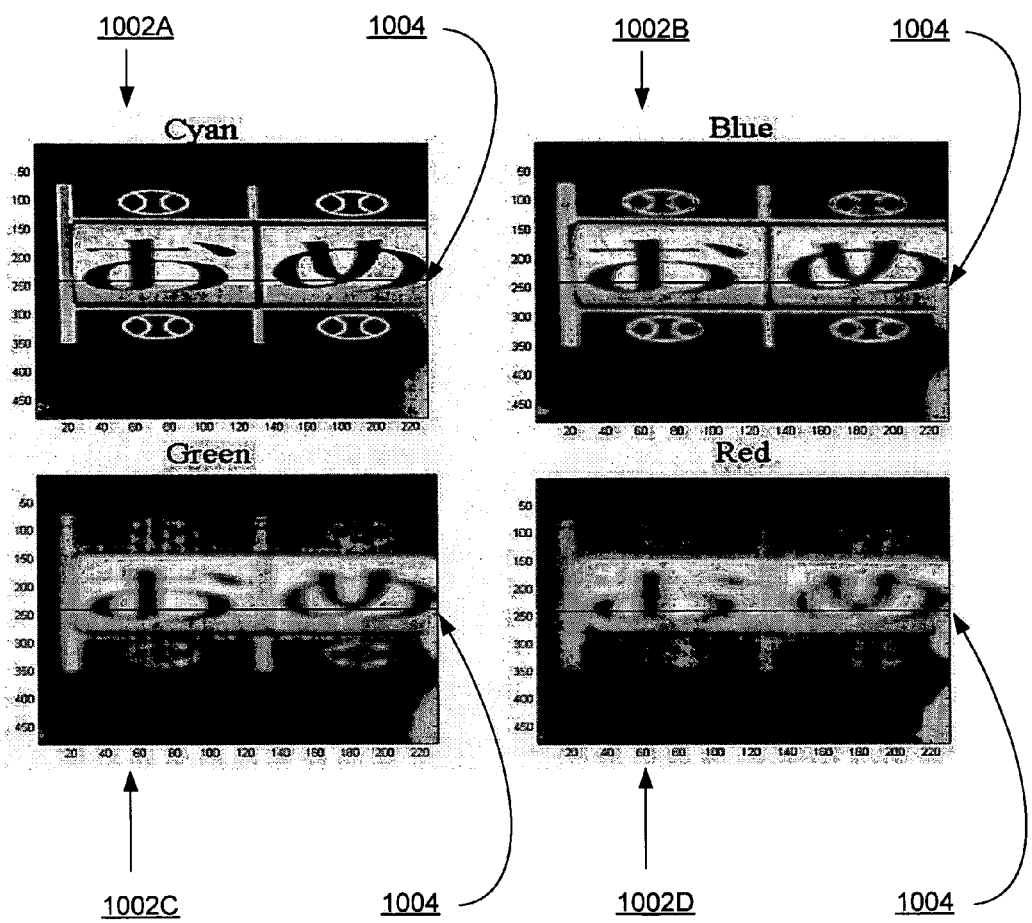
FIG. 10 illustrates one embodiment of a sample test image that has undergone increasing amounts of blur.

FIG. 10 illustrates one embodiment of the test image 1002A-D that illustrates step edges undergoing different amounts of blur. In FIG. 10, four images 1002A-D of test pattern 900 represent increasing amounts of blur applied to each test image. For example and by way of illustration, the first image 1002A appears as the sharpest image, followed by (as increasingly blurred images) the second image 1002B, third image 1002C, and fourth image 1002D. For each image, method 300 analyzes the step edges along a scan line 1004 across the different images 1002A-D.

Figure 11:
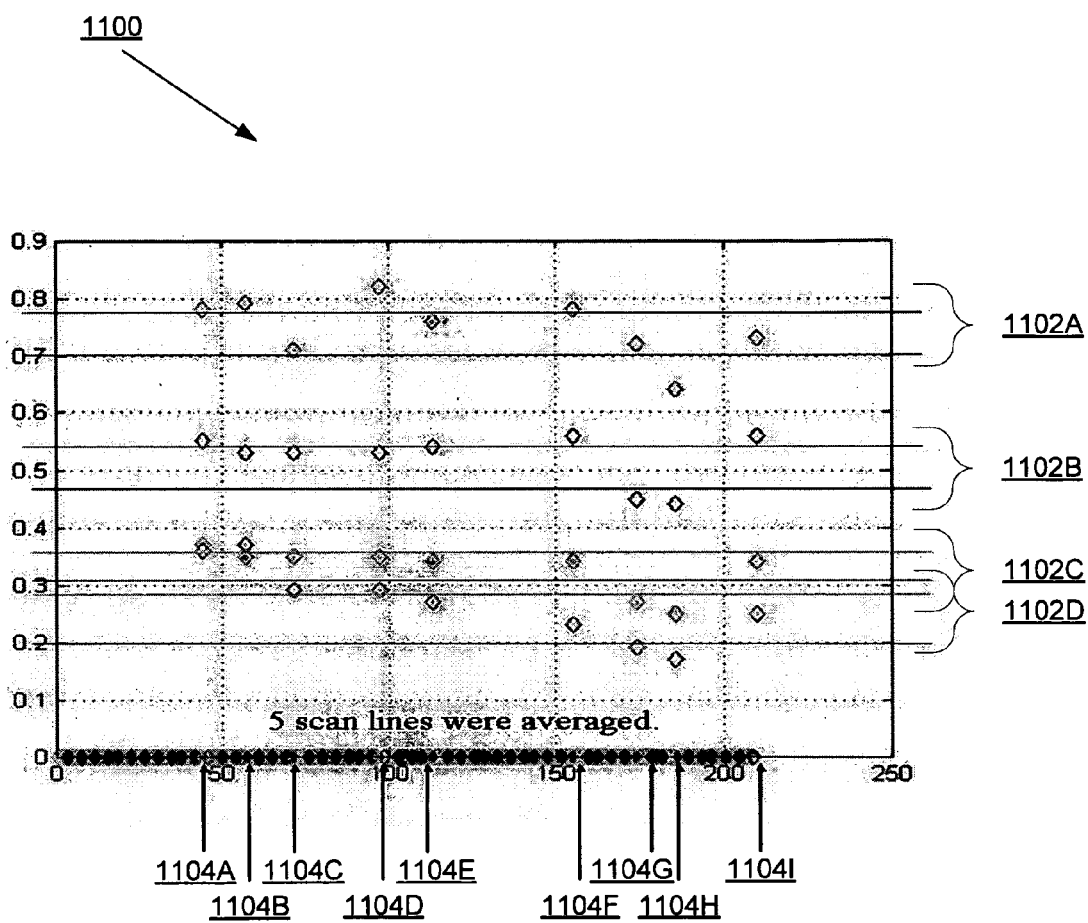
FIG. 11 illustrates one embodiment of computed pa(x) values (vertical scale for the auto focus normalization curve) for the scan line shown in FIG. 10 for increasingly blurred versions of the sample test image.

FIG. 11 illustrates one embodiment of a chart 1100 plotting computed pa(x) values at various scan lines. In FIG. 11, chart 1100 illustrates the results for the four different images 1002A-D and the corresponding pa(x) values for nine step edges 1104A-I. Each pa(x) value represents an average of five scan lines. The different groupings of pa(x) values reflect the relative focus value. That is, for each step edge 1104A-I, pa(x) values are largest for the first image 1002A corresponding to 1102A, followed by pa(x) values for second image 1002B corresponding to 1102B, the third image 1002C corresponding to 1102C, and the fourth image 1002D corresponding to 1102D.

Figure 12:
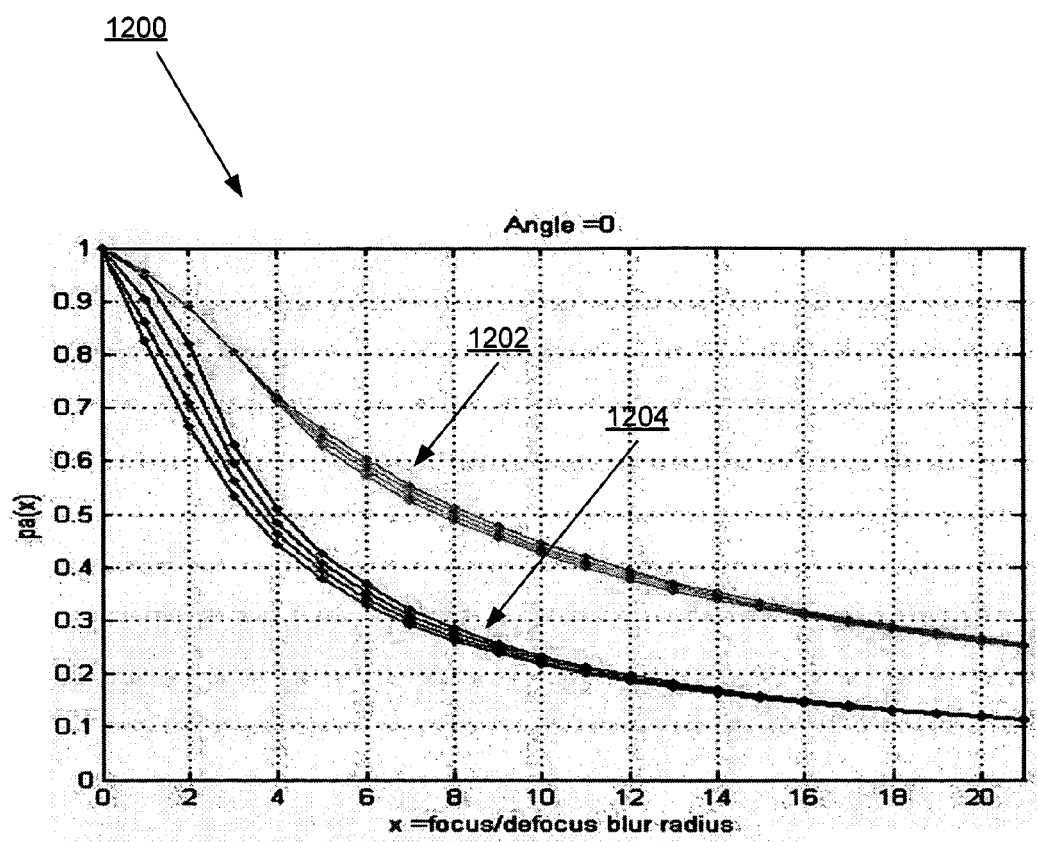
FIG. 12 illustrates one embodiment of an auto focus normalization curve calculated using two different filters.

FIG. 12 illustrates one embodiment of an auto focus normalization curve 1200 calculated with an alternative filters.

For example, curve 1202 can result using filter [−1 0 0 1] and curve 1204 can result using filter [−1 0 1]. The filter referred to is the one used in FIG. 3, Block 308. These two filters are examples of many different gradient filters that can be applied. As illustrated in FIG. 12, curve 1202 has a pa(x) value closer to one for values of defocus between zero and twenty one. In some embodiments, this is a desirable result. Alternate filters that can be used for FIG. 3, block 308 are [−1 0 0 0 1], [−1 0 0 0 0 0 1], etc.

Figure 13:
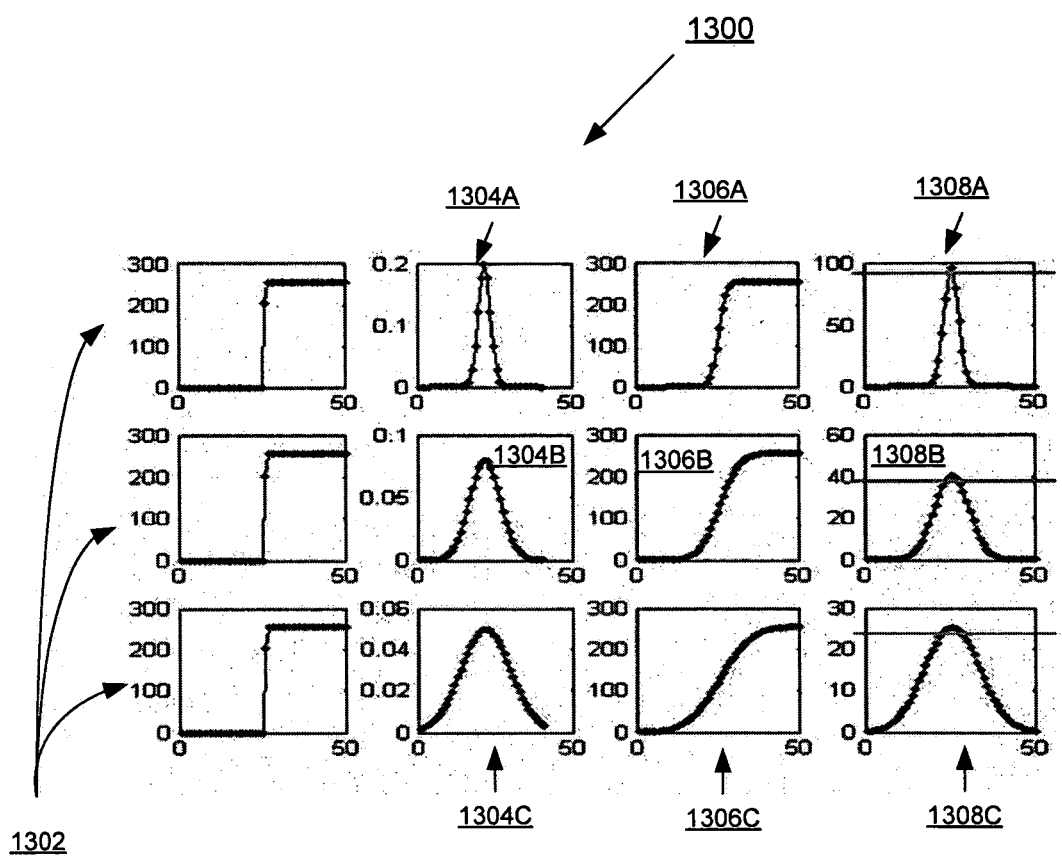
FIG. 13 illustrates one embodiment of taking a step edge, blurring the step edge with a one-dimensional gaussian blur kernel and computing the derivative of the gaussian blurred step edge.

FIG. 13 illustrates one embodiment calculating a derivative of a blurred step edge. In FIG. 13, method 300 applies Gaussian blurring functions 1304A-C to step edge 1302. Initially, a step edge can be blurred using a blurring function known in the art (Gaussian, pillbox, etc.). However, subsequent blurring that is artificially applied requires the blur function to be Gaussian smooth. As illustrated, blurring functions 1304A-C represent sigma values of two, five, and eight. In this embodiment, smaller sigma values give a smaller blur, whereas larger sigma values represent larger blurring. Alternate embodiments may use smaller, and/or larger sigma values. Applying blurring functions 1304A-C to step edge 1302 result in blurred step edge 1306A-C, respectively. Blurring a step edge results in a step 1306A-C edge that has a gradual increase in auto focus metric value instead of a sharp increase in value as in step edge 1302.

Furthermore, the derivatives of blurred step edges 1306A-C are curves 1308A-C. The derivatives of the blurrier step edges 1306A-C have lower maxima and wider peak than less blurred step edge derivatives. For example and by way of illustration, derivative blurred step edge 1308A has narrow peak and maxima near 100. On the other hand, derivative blurred step edge 1308C that has a wide peak and a maximum of twenty-five.

Figure 14:
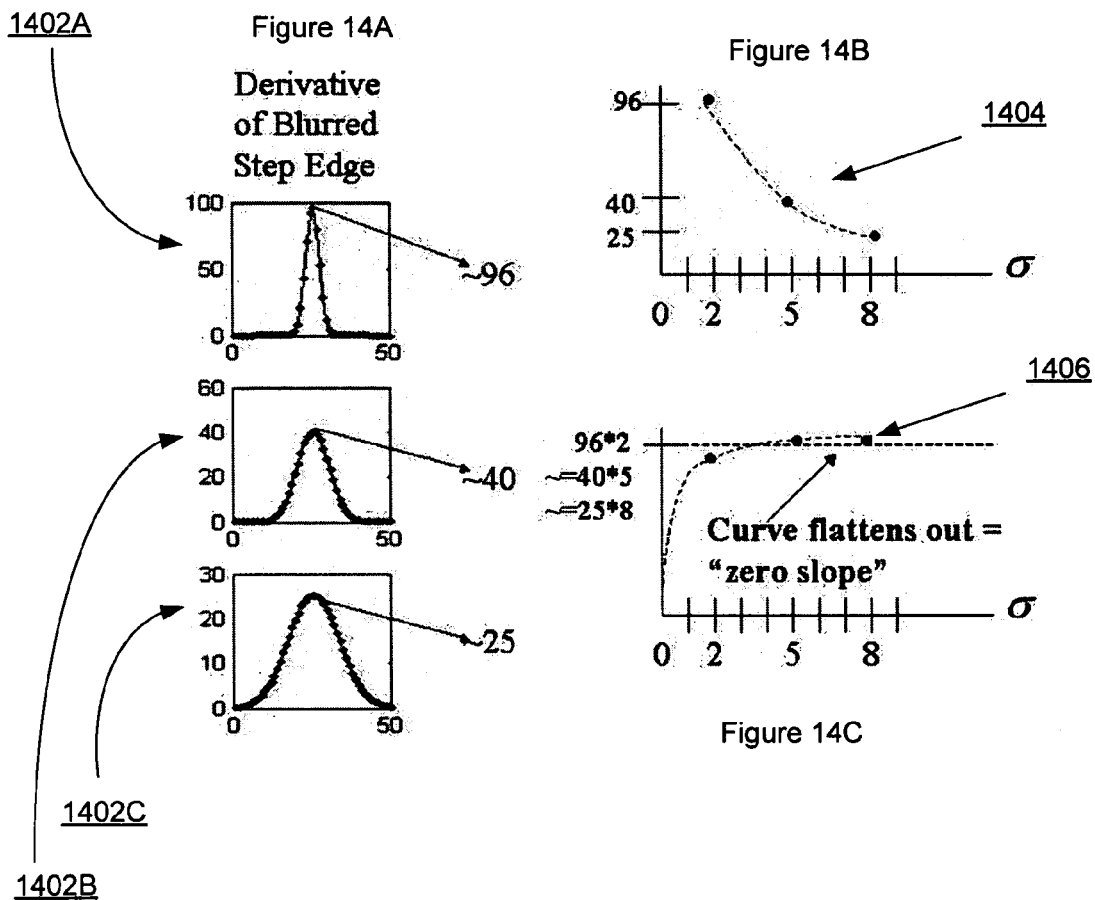
FIGS. 14A-C are figures illustrating one embodiment of computing the product of the one-dimensional gaussian blur kernel width (sigma) and the peak derivative of the blurred step edge.

FIGS. 14A-C illustrate one embodiment of the product of the gaussian blurring function and the peak of the derivative of a blurred step edge. As in FIG. 13, in FIG. 14A, three derivatives of blurred step edges 1402A-C are illustrated. Furthermore, the derivative maxima have values of twenty-five, forty, and ninety-six for blurred step edges 1402A-C, respectively.

FIG. 14B illustrates one embodiment of a curve 1404 plotting blurred step edge derivative maxima versus sigma value. As illustrated in FIG. 14B, there is an inverse relationship between the sigma value of the blurring function and the derivative maxima. For example and by way of illustration, as the value of sigma increases (2→5→8), the derivative maxima decreases respectively (96→40→25).

FIG. 14C illustrates one embodiment of a curve 1406 plotting the product of sigma and derivative maxima versus sigma. In FIG. 14C, as sigma increases, the product flattens out to a constant value. For example and by way of illustration, the product is 192 for sigma value of two, whereas the product is 200 for sigma values of five and eight. This suggests that as blurred step edge becomes completely blurred, the product between the derivative maxima and sigma value approaches a constant value.

Figure 15:
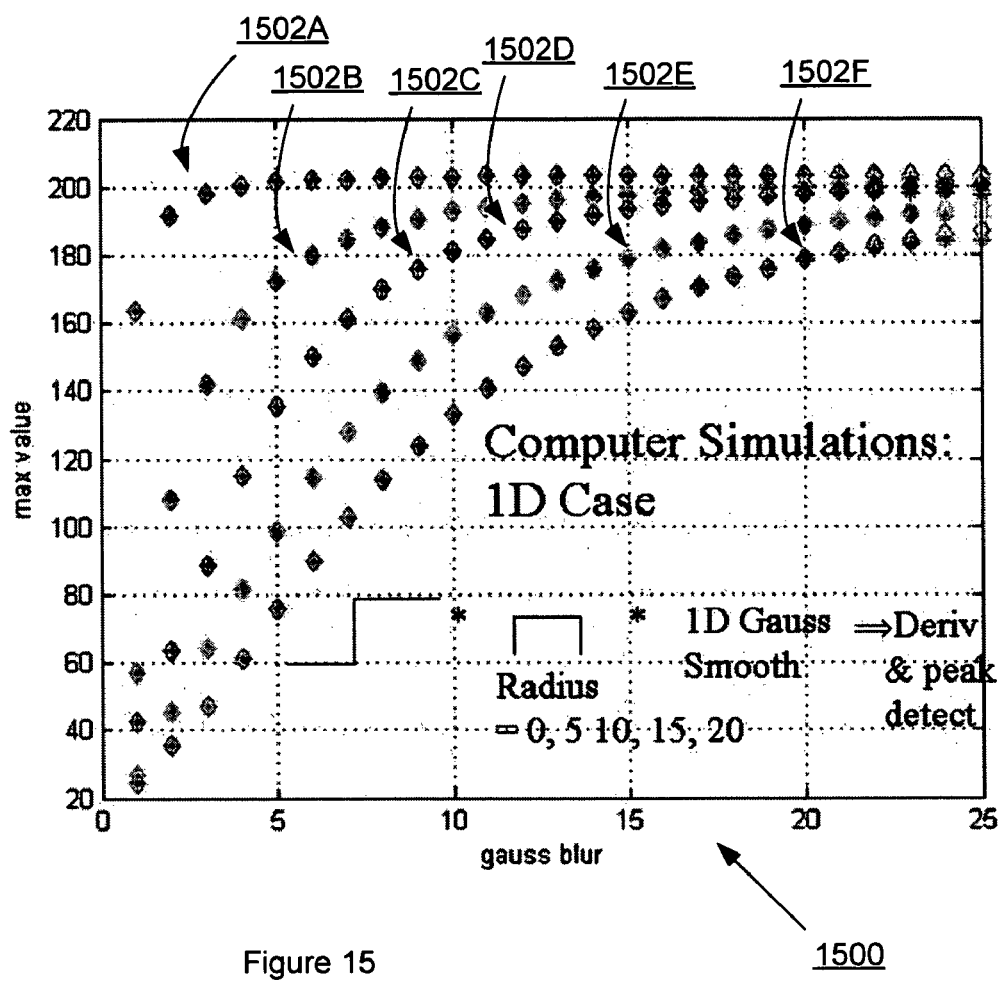
FIG. 15 illustrates one embodiment of a one-dimensional computer simulation of the sigma-derivative maximum product. Different one-dimensional pillbox blur kernels are applied to the step edge. The pillbox blurred step edge is then blurred using one-dimensional Gaussian kernels of increasing width (sigma).

FIG. 15 illustrates one embodiment of a one-dimensional computer simulation 1500 of the sigma-derivative maximum product for different pillbox radius values. In FIG. 15, a one-dimensional pillbox blurring function is applied to zero degree one-dimensional step edge. For example and by way of illustration, the step edge used for curve 1502A has a pillbox blurring function of zero applied to it, while the step edges used for curves 1502B-E has a five, ten, fifteen, and twenty applied to them, respectively.

Furthermore, increasing the amounts of Gaussian blur applied to each pillbox blurred step edge results in curves 1502A-E. As in FIG. 14C, increased blur results in the product of sigma and step edge derivative maxima flattening out to a constant value. For example and by way of illustration, the sigma-derivative maximum product flattens out around 200 for curves 1502A-C, curve 1502D flattens out at a value of approximately 190, and curve 1502E flattens out at a value of approximately 185. The simulation in FIG. 15 illustrates that applying increasing amounts of Gaussian blur to pillbox blurred step edges results in a constant sigma-derivative maximum product.

Figure 16:
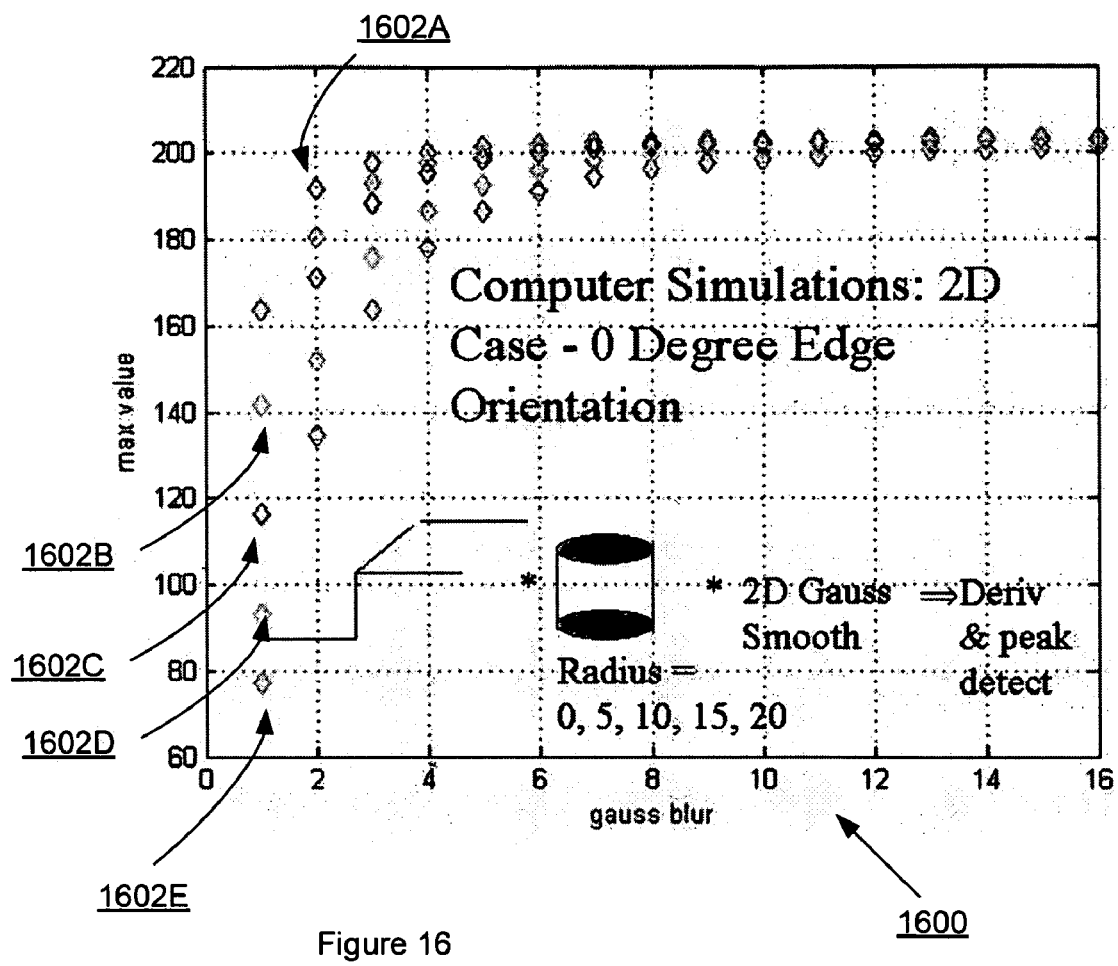
FIG. 16 illustrates one embodiment of a two-dimensional computer simulation of the sigma-derivative maximum product. Different two-dimensional pillbox blur kernels are applied to the step edge. The pillbox blurred step edge is then blurred using two-dimensional Gaussian kernels of increasing width (sigma).

FIG. 16 illustrates one embodiment of a two-dimensional computer simulation 1600 of the sigma-derivative maximum product for different pillbox radius values. Similar to FIG. 16, in FIG. 16, a two-dimensional pillbox blurring function is applied to zero degree two-dimensional step edge. For example and by way of illustration, the step edge used for curve 1602A has a pillbox blurring functions of zero applied to it, while the step edges used for curves 1602B-E has a pillbox blurring functions of five, ten, fifteen, and twenty applied to them, respectively. In general, blurring in the one dimensional case yields different results than blurring in the two dimensional case, because the blurring function for the two case are different.

Furthermore, increasing the amounts of Gaussian blur applied to each pillbox blurred step edge results in curves 1602A-E. As in FIG. 15C, increased blur results in the product of sigma and step edge derivative maxima flattening out to a constant value. For example and by way of illustration, the sigma-derivative maximum product flattens out around 200 for curves 1602A-E. As with FIG. 16, the simulation in FIG. 16 also illustrates that applying increasing amounts of Gaussian blur to pillbox blurred step edges result in a constant sigma-derivative maximum product.

Figure 17A:
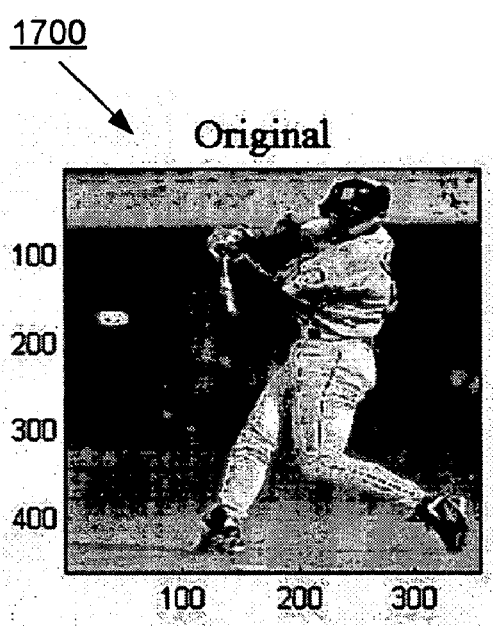
FIGS. 17A-B illustrate one embodiment of applying an artificial two-dimensional pillbox blur kernel to an image.
Figure 17B:
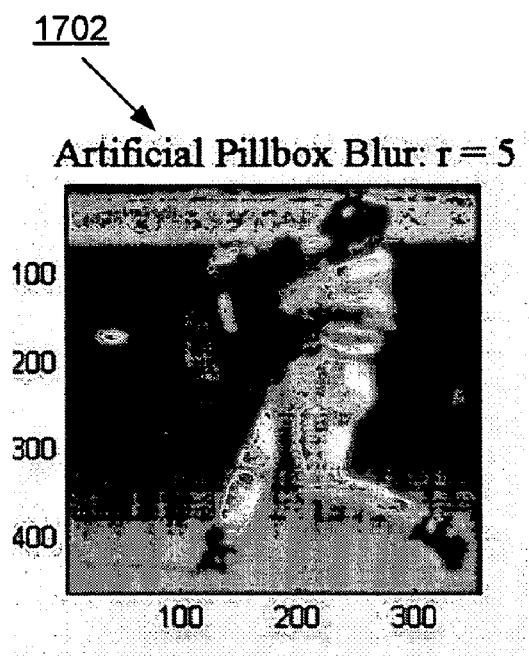

FIGS. 17A-B illustrate one embodiment applying an artificial pillbox blur to an image. In FIG. 17A, an original image 1700 of a baseball player swings a bat is illustrated. Image 1700 has step edges or varying angles, for example, where the boundary of the player intersects with the background.

On the other hand, FIG. 17B illustrates one embodiment of image 1700 that is the result of applying a blurring pillbox function of radius five to image 1700. The resulting image 1702 illustrates a blurred player against a blurred background. Alternate embodiments may apply more or less blurring using a pillbox function and/or an equivalent functions used to blur images.

Figure 18:
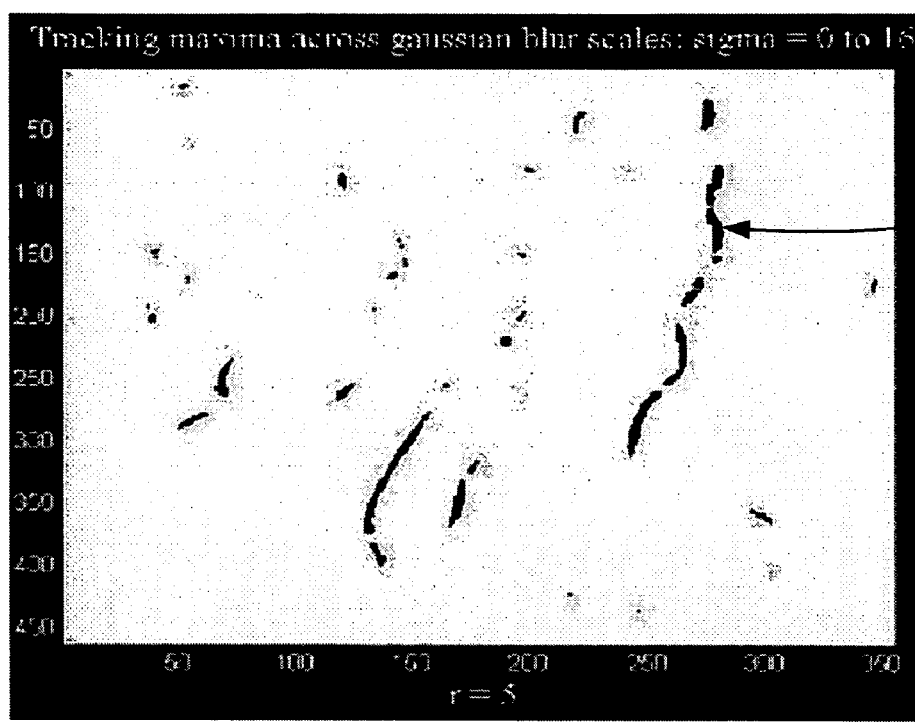
FIG. 18 illustrates one embodiment of tracking maxima across gaussian blur.

FIG. 18 illustrates one embodiment of mask 1800 that tracks maxima across gaussian blur. In FIG. 18, image 1800 tracks the derivative maxima of the step edges. Image 1800 illustrates a faint outline of the ballplayer from image 1800. For example and by way of illustration, method 300 generated image 1800 using gaussian blur scale sigma values from between zero to sixteen. In addition, image 1800 illustrates maxima 1802 that tracks the back of the ballplayer.

Figure 19:
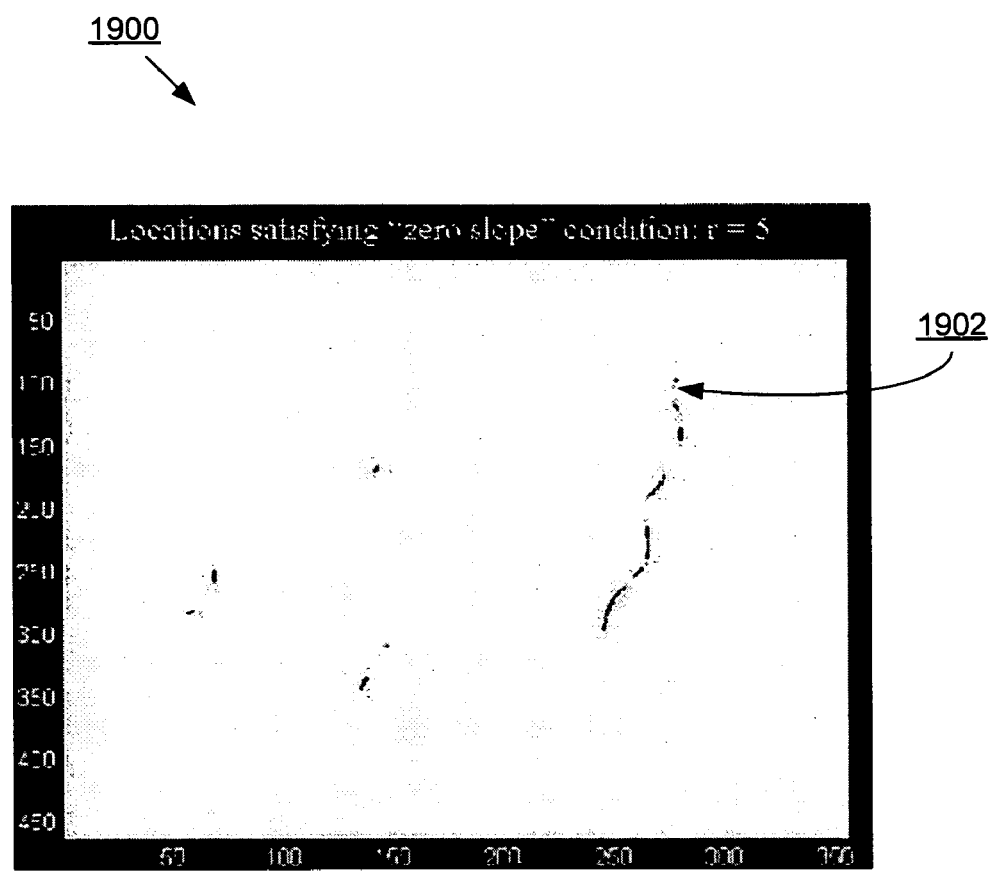
FIG. 19 illustrates one embodiment of tracking maxima across gaussian blur and identifying the corresponding locations that satisfy the zero slope condition.

FIG. 19 illustrates one embodiment of tracking maxima across gaussian blur where locations satisfy a zero slope condition. In FIG. 19, image 1900 tracks the derivative maxima of the step edges that satisfy the zero slope condition. A zero slope condition is where the curves shown in FIG. 16 or 17 flatten out to zero slope. The resulting image 1800 comprises faint outlines that are parts of the ballplayer from image 1700. Because of the zero slope condition, only some of the ballplayer step edges are illustrated in image 1800.

Figure 20:
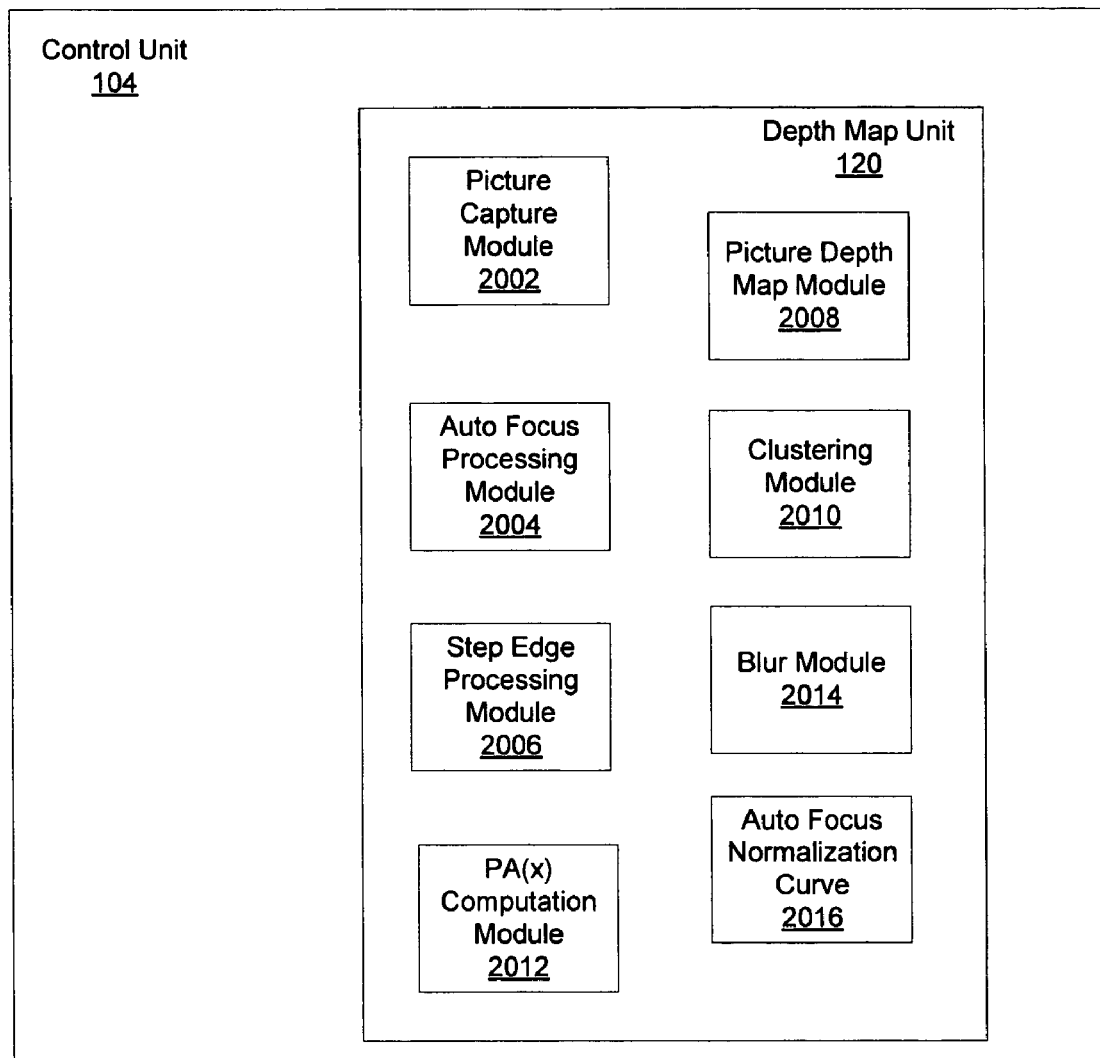
FIG. 20 is a block diagram illustrating one embodiment of an image device control unit that calculates a depth map.

FIG. 20 is a block diagram illustrating one embodiment of an image device control unit that calculates a depth map. In one embodiment, image control unit 104 contains depth map unit 120. Alternatively, image control unit 104 does not contain depth map unit 120, but is coupled to depth map unit 120.

Depth map unit 120 comprises picture capture module 2002, auto focus processing module 2004, step edge processing module 2006, picture depth map module 2008, clustering module 2010, pa(x) computation module 2012, blur module 2014, and auto focus normalization curve module 2016. Picture capture module 2002 causes imaging acquisition unit 102 to capture the pictures. Auto focus processing module 2004 processes the auto focus information as illustrated in FIG. 3, block 302. Step edge processing module 2006 locates and scales the step edges in the scan line auto focus curve as illustrated in FIG. 3, blocks 304-310. In addition, picture depth map module 2008 calculates the depth value and map from blur module 2014. Blur module 2014 computes the blur from an associated pa(x) value as illustrated in FIG. 3, block 326. Clustering module 2010 applies a clustering algorithm to the depth map to extract regions containing similar depths and to isolate depth map regions corresponding to outliers and singularities as illustrated in FIG. 3, block 330. Pa(x) computation module 2012 calculates the step edge pa(x) value as illustrated in FIG. 3, block 312-320. Auto focus normalization curve module 2016 computes the auto focus normalization curves for different step edge angles as illustrated in FIG. 3, blocks 322-324.

In practice, the methods described herein may constitute one or more programs made up of machine-executable instructions. Describing the method with reference to the flowchart in FIG. 3 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions may be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 21:
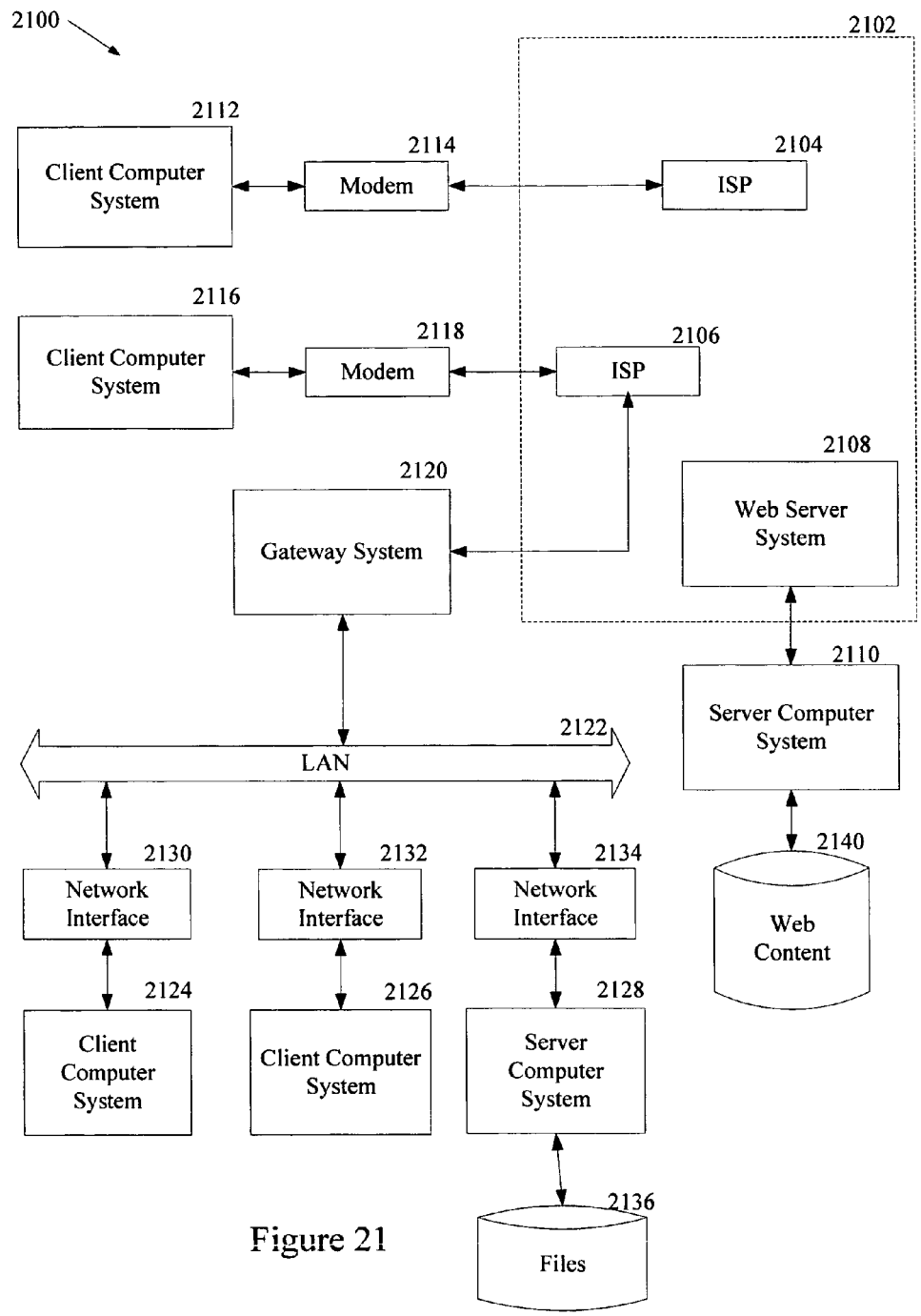
FIG. 21 is a diagram of one embodiment of an operating environment suitable for practicing the present invention.

FIG. 21 shows several computer systems 2100 that are coupled together through a network 2102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 2102 is typically provided by Internet service providers (ISP), such as the ISPs 2104 and 2106. Users on client systems, such as client computer systems 2112, 2116, 2124, and 2126 obtain access to the Internet through the Internet service providers, such as ISPs 2104 and 2106. Access to the Internet allows users of the client computer systems to exchange information, receive and send e-mails, and view documents, such as documents which have been prepared in the HTML format. These documents are often provided by web servers, such as web server 2108 which is considered to be "on" the Internet. Often these web servers are provided by the ISPs, such as ISP 2104, although a computer system may be set up and connected to the Internet without that system being also an ISP as is well known in the art.

The web server 2108 is typically at least one computer system which operates as a server computer system and is configured to operate with the protocols of the World Wide Web and is coupled to the Internet. Optionally, the web server 2108 may be part of an ISP which provides access to the Internet for client systems. The web server 2108 is shown coupled to the server computer system 2110 which itself is coupled to web content 2112, which may be considered a form of a media database. It will be appreciated that while two computer systems 2108 and 2110 are shown in FIG. 21, the web server system 2108 and the server computer system 2110 may be one computer system having different software components providing the web server functionality and the server functionality provided by the server computer system 2110 which will be described further below.

Client computer systems 2112, 2116, 2124, and 2126 may each, with the appropriate web browsing software, view HTML pages provided by the web server 2108. The ISP 2104 provides Internet connectivity to the client computer system 2112 through the modem interface 2114 which may be considered part of the client computer system 2112. The client computer system may be a personal computer system, a network computer, a Web TV system, a handheld device, or other such computer system. Similarly, the ISP 2106 provides Internet connectivity for client systems 2116, 2124, and 2126, although as shown in FIG. 21, the connections are not the same for these three computer systems. Client computer system 2116 is coupled through a modem interface 2118 while client computer systems 2124 and 2126 are part of a LAN. While FIG. 21 shows the interfaces 2114 and 2118 as generically as a "modem," it will be appreciated that each of these interfaces may be an analog modem, ISDN modem, cable modem, satellite transmission interface, or other interfaces for coupling a computer system to other computer systems. Client computer systems 2124 and 2116 are coupled to a LAN 2122 through network interfaces 2130 and 2132, which may be Ethernet network or other network interfaces. The LAN 2122 is also coupled to a gateway computer system 2120 which may provide firewall and other Internet related services for the local area network. This gateway computer system 2120 is coupled to the ISP 2106 to provide Internet connectivity to the client computer systems 2124 and 2126. The gateway computer system 2120 may be a conventional server computer system. Also, the web server system 2108 may be a conventional server computer system.

Alternatively, as well-known, a server computer system 2128 may be directly coupled to the LAN 2122 through a network interface 2134 to provide files 2136 and other services to the clients 2124, 2126, without the need to connect to the Internet through the gateway system 2120. Furthermore, any combination of client systems 2112, 2116, 2124, 2126 may be connected together in a peer-to-peer network using LAN 2122, Internet 2102 or a combination as a communications medium. Generally, a peer-to-peer network distributes data across a network of multiple machines for storage and retrieval without the use of a central server or servers. Thus, each peer network node may incorporate the functions of both the client and the server described above.

Figure 22:
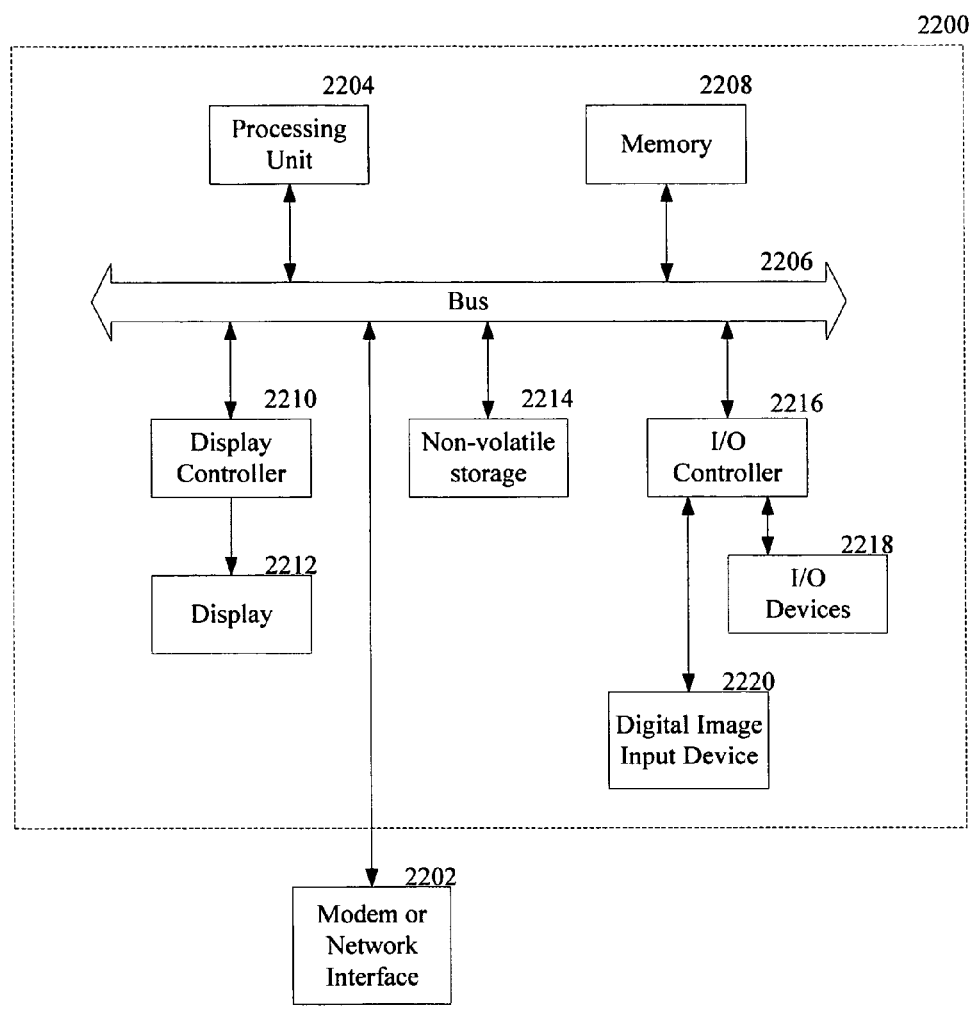
FIG. 22 a diagram of one embodiment of a computer system suitable for use in the operating environment of FIG. 3.

The following description of FIG. 22 is intended to provide an overview of computer hardware and other operating components suitable for performing the methods of the invention described above, but is not intended to limit the applicable environments. One of skill in the art will immediately appreciate that the embodiments of the invention may be practiced with other computer system configurations, including set-top boxes, hand-held devices, multiprocessor systems, microprocessor-based or programmable consumer electronics, network PCs, minicomputers, mainframe computers, and the like. The embodiments of the invention may also be practiced in distributed computing environments where tasks are performed by remote processing devices that are linked through a communications network, such as peer-to-peer network infrastructure.

FIG. 22 shows one example of a conventional computer system that may be used as encoder or a decoder. The computer system 2200 interfaces to external systems through the modem or network interface 2202. It will be appreciated that the modem or network interface 2202 may be considered to be part of the computer system 2200. This interface 2202 may be an analog modem, ISDN modem, cable modem, token ring interface, satellite transmission interface, or other interfaces for coupling a computer system to other computer systems. The computer system 2202 includes a processing unit 2204, which may be a conventional microprocessor such as an Intel Pentium microprocessor or Motorola Power PC microprocessor. Memory 2208 is coupled to the processor 2204 by a bus 2206. Memory 2208 may be dynamic random access memory (DRAM) and may also include static RAM (SRAM). The bus 2206 couples the processor 2204 to the memory 2208 and also to non-volatile storage 2214 and to display controller 2210 and to the input/output (I/O) controller 2216. The display controller 2210 controls in the conventional manner a display on a display device 2212 which may be a cathode ray tube (CRT) or liquid crystal display (LCD). The input/output devices 2218 may include a keyboard, disk drives, printers, a scanner, and other input and output devices, including a mouse or other pointing device. The display controller 2210 and the I/O controller 2216 may be implemented with conventional well known technology. A digital image input device 2220 may be a digital camera which is coupled to an I/O controller 2216 in order to allow images from the digital camera to be input into the computer system 2200. The non-volatile storage 2214 is often a magnetic hard disk, an optical disk, or another form of storage for large amounts of data. Some of this data is often written, by a direct memory access process, into memory 2208 during execution of software in the computer system 2200. One of skill in the art will immediately recognize that the terms "computer-readable medium" and "machine-readable medium" include any type of storage device that is accessible by the processor 2204 and also encompass a carrier wave that encodes a data signal.

Network computers are another type of computer system that may be used with the embodiments of the present invention. Network computers do not usually include a hard disk or other mass storage, and the executable programs are loaded from a network connection into the memory 2208 for execution by the processor 2204. A Web TV system, which is known in the art, is also considered to be a computer system according to the embodiments of the present invention, but it may lack some of the features shown in FIG. 22, such as certain input or output devices. A typical computer system will usually include at least a processor, memory, and a bus coupling the memory to the processor.

It will be appreciated that the computer system 2200 is one example of many possible computer systems, which have different architectures. For example, personal computers based on an Intel microprocessor often have multiple buses, one of which may be an input/output (I/O) bus for the peripherals and one that directly connects the processor 2204 and the memory 2208 (often referred to as a memory bus). The buses are connected together through bridge components that perform any necessary translation due to differing bus protocols.

It will also be appreciated that the computer system 2200 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 2214 and causes the processor 2204 to execute the various acts required by the operating system to input and output data and to store data in memory, including storing files on the non-volatile storage 2214.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising: receiving an auto focus curve that is associated with a picture of a three dimensional spatial scene, wherein the auto focus curves comprises a step edge; and computing a picture depth value based on the step edge and an auto focus normalization reference curve, wherein the auto focus normalization reference curve correlates the step edge to a known amount of blurring and the computing the picture depth value comprises detecting the step edge in the auto focus curve, shifting the step edge to have a baseline of zero; computing a one dimensional gradient of the step edge; locating a center of the step edge; computing a defocus measurement value for the step edge based on the one dimensional step edge and step edge center; deriving a picture blur value based on the defocus measurement value and the auto focus normalization reference curve; and computing the picture depth value based on the picture blur value.

2. The computerized method of claim 1, further comprising:
generating a plurality of auto focus normalization reference curves for different step edge angles.

3. The computerized method of claim 2, further comprising:
selecting the auto focus normalization reference curve from the plurality of auto focus normalization reference curves, where the auto focus normalization reference curve is associated with an attribute selected from the group consisting of a step edge angle and a step edge contrast.

4. The computerized method of claim 1, further comprising:
generating a picture depth map by computing a plurality of picture depth values for a plurality of step edges.

5. The computerized method of claim 4, further comprising:
applying a clustering algorithm to the picture depth map.

6. The computerized method of claim 1, wherein the computing the picture depth value comprises: calculating, from the picture blur value the picture depth map value using the equation d o=fD D−f−2 .times. r .times. .times. f number, where f is the camera lens focal length, D the distance between the image plane inside the camera and the lens, r is the blur radius of the image on the image plane and f.sub.number is the f.sub.number of the camera lens.

7. A machine readable medium having executable instructions to cause a processor to perform a method comprising: receiving an auto focus curve, that is associated with a picture of a three dimensional spatial scene, wherein the auto focus curves comprises a step edge; and computing a picture depth value based on the step edge and an auto focus normalization reference curve, wherein the auto focus normalization reference curve correlates the step edge to a known amount of blurring and the computing the picture depth value comprises detecting the step edge in the auto focus curve; shifting the step edge to have a baseline of zero; computing a one dimensional gradient of the step edge; locating a center of the step edge; computing a defocus measurement value for the step edge based on the one dimensional step edge and step edge center; deriving a picture blur value based on the defocus measurement value and the auto focus normalization reference curve; and computing the picture depth value based on the picture blur value.

8. The machine readable storage medium of claim 7, further comprising:
generating a plurality of auto focus normalization reference curves for different step edge angles.

9. The machine readable medium of claim 8, further comprising:
selecting the auto focus normalization reference curve from the plurality of auto focus normalization reference curves, where the auto focus normalization reference curve is associated with an attribute selected from the group consisting of a step edge angle and a step edge contrast.

10. The machine readable storage medium of claim 7, further comprising:
generating a picture depth map by computing a plurality of picture depth values for a plurality of step edges.

11. The machine readable storage medium of claim 10, further comprising:
applying a clustering algorithm to the picture depth map.

12. The machine readable medium of claim 7, wherein the computing the picture depth value comprises: calculating, from the picture blur value, the picture depth map value using the equation d o =fD/D−f−2 .times. r .times. .times. f number, where f is the camera lens focal length, D the distance between the image plane inside the camera and the lens, r is the blur radius of the image on the image plane and f .sub .number is the f.sub. number of the camera lens.

13. An apparatus comprising: means for receiving an auto focus curve, that is associated with a picture of a three dimensional spatial scene, wherein the auto focus curves comprises a step edge; and means for computing a picture depth value based on the step edge and an auto focus normalization reference curve wherein the auto focus normalization reference curve correlates the step edge to a known amount of blurring and the means for computing the picture depth value further comprises means for detecting the step edge in the auto focus curve; means for shifting the step edge to have a baseline of zero; means for computing a one dimensional gradient of the step edge; means for locating a center of the step edge, means for computing a defocus measurement value for the step edge based on the one dimensional step edge and step edge center; means for deriving a picture blur value based on the defocus measurement value and the auto focus normalization reference curve; and means for computing the picture depth value based on the picture blur value.

14. The apparatus of claim 13, further comprising:
means for generating a plurality of auto focus normalization reference curves for different step edge angles.

15. The apparatus of claim 14, further comprising: means for selecting the auto focus normalization reference curve from the plurality of auto focus normalization reference curves, where the auto focus normalization reference curve is associated with an attribute selected from the group consisting of a step edge angle and a step edge contrast.

16. The apparatus of claim 13, further comprising:
means for generating a picture depth map by computing a plurality of picture depth values for a plurality of step edges.

17. A system comprising: a processor; a memory coupled to the processor though a bus; and a process executed from the memory by the processor to cause the processor to receive an auto focus curve, that is associated with a picture of a three dimensional spatial scene, wherein the auto focus curves comprises a step edge; and compute a picture depth value based on the step edge and an auto focus normalization reference curve, wherein the auto focus normalization reference curve correlates the step edge to a known amount of blurring and the process further causes the processor to detect the step edge in the auto focus curve, shift the step edge to have a baseline of zero, compute an one dimensional gradient of the step edge, locate a center of the step edge, compute a defocus measurement value for the step edge based on the one dimensional step edge and step edge center, derive a picture blur value based on the defocus measurement value and the auto focus normalization reference curve, and compute the picture depth value based on the picture blur value.

18. The system of claim 17, wherein the process further causes the processor to generate a plurality of auto focus normalization reference curves for different step edge angles.

19. The system of claim 18, wherein the process further causes the processor to select the auto focus normalization reference curve from the plurality of auto focus normalization reference curves, where the auto focus normalization reference curve is associated with an attribute selected from the group consisting of a step edge angle and a step edge contrast.

20. The system of claim 17, wherein the process further causes the processor to generate a picture depth map by computing a plurality of picture depth values for a plurality of step edges.

* * * * *